(12) United States Patent
Narayanan et al.

(10) Patent No.: US 11,652,786 B2
(45) Date of Patent: May 16, 2023

(54) NETWORK FABRIC DEPLOYMENT SYSTEM

(71) Applicant: Dell Products L.P., Round Rock, TX (US)

(72) Inventors: Padmanabhan Narayanan, Redmond, WA (US); Raghava Krishna Jagarlapudi, Ongole (IN); Arun Dharmalingaswamy, Kanyakumari (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/372,982

(22) Filed: Jul. 12, 2021

(65) Prior Publication Data

US 2022/0407836 A1    Dec. 22, 2022

(30) Foreign Application Priority Data

Jun. 17, 2021  (IN) .............................. 202111027076

(51) Int. Cl.
*H04L 61/5014* (2022.01)
*G06F 8/61* (2018.01)
(Continued)

(52) U.S. Cl.
CPC ........ *H04L 61/5014* (2022.05); *G06F 3/0607* (2013.01); *G06F 3/067* (2013.01); *G06F 3/0629* (2013.01); *G06F 3/0665* (2013.01); *G06F 8/63* (2013.01); *G06F 9/4416* (2013.01); *H04L 61/5061* (2022.05)

(58) Field of Classification Search
CPC ............ H04L 61/5014; H04L 61/5061; G06F 3/0607; G06F 3/0629; G06F 3/0665; G06F 3/067; G06F 8/63; G06F 9/4416
See application file for complete search history.

(56) References Cited

U.S. PATENT DOCUMENTS

| | | | |
|---|---|---|---|
| 2015/0156067 A1* | 6/2015 | Tung .................. | H04L 41/0806 709/209 |
| 2019/0149416 A1* | 5/2019 | Grevers, Jr. ........ | H04L 41/0856 370/254 |

(Continued)

*Primary Examiner* — Michael A Keller
(74) *Attorney, Agent, or Firm* — Joseph Mencher

(57) ABSTRACT

A network fabric deployment system includes a fabric deployment management system that is coupled to a DHCP server. The fabric deployment management system generates a cloud-based network fabric that is based on a network fabric topology file and that includes a plurality of cloud-based networking devices that are assigned a physical networking device identifier that identifies a corresponding physical networking device. The fabric deployment management system configures and validates each of the plurality of cloud-based networking devices causing each physical networking device identifier being mapped to an IP address at the DHCP server and then retrieves a deployment image file from each of the plurality of cloud-based networking devices that have been configured and validated, and stores each of the deployment image files in a database in association with the physical networking device identifier such that the corresponding physical networking device boots from that deployment image file.

20 Claims, 20 Drawing Sheets

(51) Int. Cl.
*G06F 3/06* (2006.01)
*G06F 9/4401* (2018.01)
*H04L 61/5061* (2022.01)

(56) References Cited

U.S. PATENT DOCUMENTS

2019/0250960 A1\* 8/2019 Zhang .................. G06F 9/4401
2021/0271506 A1\* 9/2021 Ganguly ................ H04L 67/34

\* cited by examiner

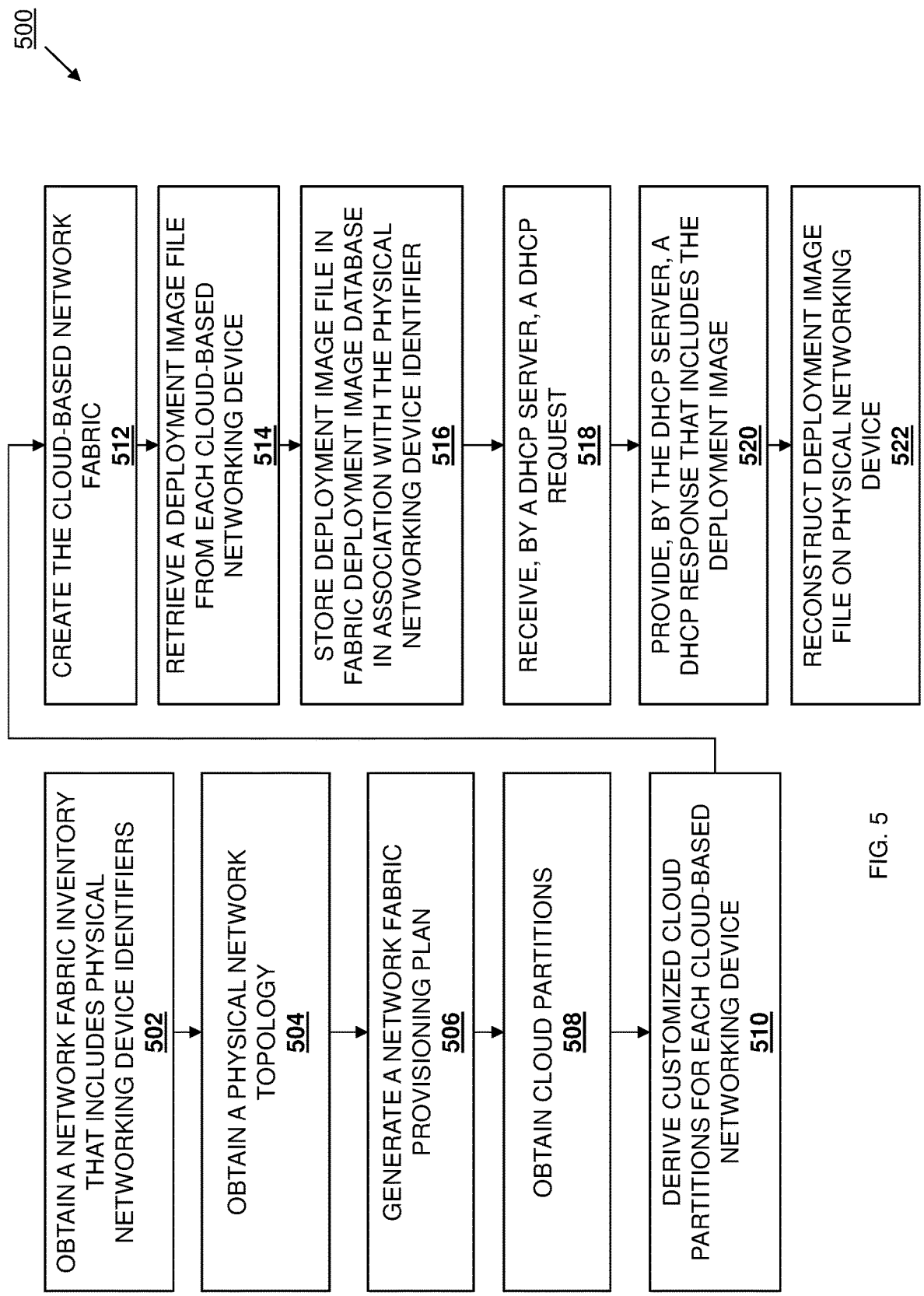

NETWORK FABRIC DEPLOYMENT SYSTEM

CROSS-REFERENCE TO RELATED APPLICATIONS

This application claims priority to Indian Provisional Application No. 202111027076, filed Jun. 17, 2021, the disclosure of which is incorporated herein by reference in its entirety.

BACKGROUND

The present disclosure relates generally to information handling systems, and more particularly to deploying a physical networking fabric that includes networking information handling systems As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, are often deployed in data centers according to a networking topology, and the amount of time required to bring-up, upgrade, or otherwise expand a data center is an important factor when deploying switch devices. For example, in order to deploy switch devices in a data center, the switch devices often go through an iterative process of operating system image, container, and package upgrades that are interspersed with incremental configurations and validations until the switch device is operating to provide network traffic. Most switch device vendors provide fabric deployment orchestrators (e.g., a Zero Touch Provisioning/Deployment (ZTP/ZTD) solution, a Smart Fabric Director (SFD) provided by DELL® Inc. of Round Rock, Tex., United States, a Bare Metal Provisioning (BMP) solution, and/or other fabric deployment orchestrators known in the art) to install Network Operating system (NOS) images (e.g., OS9, OS10, SONiC, and/or other NOS images known in the art), as well as configure and validate each switch device. These fabric deployment orchestrators may begin with either an Open Network Install Environment (ONIE) or a NOS base-image that may be installed during manufacturing, and may then proceed with the iterative process of deploying the switch device until its deployment is complete.

In order to expedite and to avoid costly configuration errors during deployment of a network fabric that includes a plurality of switch devices in a data center, many customers and/or other users of switch devices generate a cloud-based staging area where a complete cloud-based network fabric (or at least a few Points of Delivery (PoDs) that may include one or more Top-of-Rack (ToR) switches/leaf switches, spine switches, super-spine switches, border leaf switches, and/or any necessary test virtual machines is spun up (using the NOS "virtual switch mode"). The configurations are validated in the cloud-based staging area before replicating the deployment of the cloud-based network fabric on the physical network fabric using the fabric deployment orchestrator. As part of the fabric deployment orchestrator process and in either the physical network fabric or in the cloud-based network fabric, a switch device may undergo multiple NOS, service, and/or container reboots and validations before being completely deployed. Despite various optimizations, the time taken from power up to complete deployment is substantial (e.g., several hours to several days) and varies depending on the type of switch device. Furthermore, each switch device (including switch devices belonging to the same tier) may have unique provisioning requirements (NOS image, port profiles, configuration templates, custom add-on packages, customer specific containers/business logic, and/or other provisioning requirements). As a result, each switch device may have unpredictable timing requirements and unique errors that may arise during its deployment.

Accordingly, it would be desirable to provide a network fabric deployment system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a fabric deployment management engine that is configured to: generate a cloud-based network fabric that is based on a network fabric topology file and that includes a plurality of cloud-based networking devices, wherein each of the plurality of cloud-based networking devices deployed in the cloud-based network fabric corresponds to a physical networking device included in a physical network fabric that is connected or will be connected according to the network fabric topology, and wherein each cloud-based networking device is assigned a physical networking device identifier that identifies the corresponding physical networking device for that cloud-based networking device; configure and validate each of the plurality of cloud-based networking devices included in the cloud-based network fabric until the cloud-based network fabric is provisioned in a manner that allows the plurality of cloud-based networking devices to perform networking actions on data traffic, wherein the configuring and validating includes causing each of the plurality of cloud-based networking devices to obtain an Internet Protocol (IP) address from a Dynamic Host Configuration Protocol (DHCP) server using the physical networking device identifier assigned to that cloud-based networking device such that that physical networking device identifier is mapped to the IP address at the DHCP server; retrieve a deployment image file from each of the plurality of cloud-based networking devices that were configured and validated, wherein each deployment image file includes a deployment image of that cloud-based networking device that has been configured and validated; and store each of the deployment image files in a fabric deployment image database in association with the physical networking device identifier assigned to the cloud-based networking device associated with that deployment image file.

BRIEF DESCRIPTION OF THE DRAWINGS

FIG. 5 is a flow chart illustrating an embodiment of a method for deploying a network fabric.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
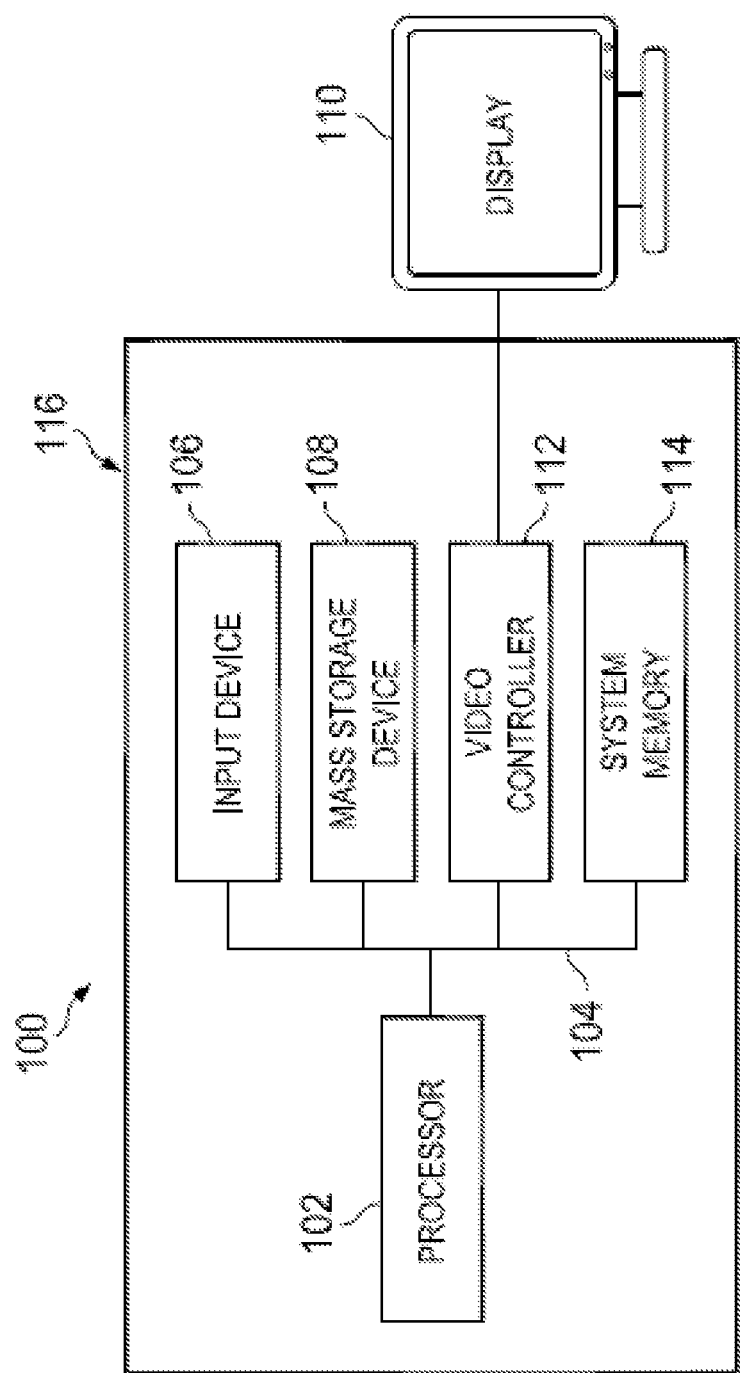
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
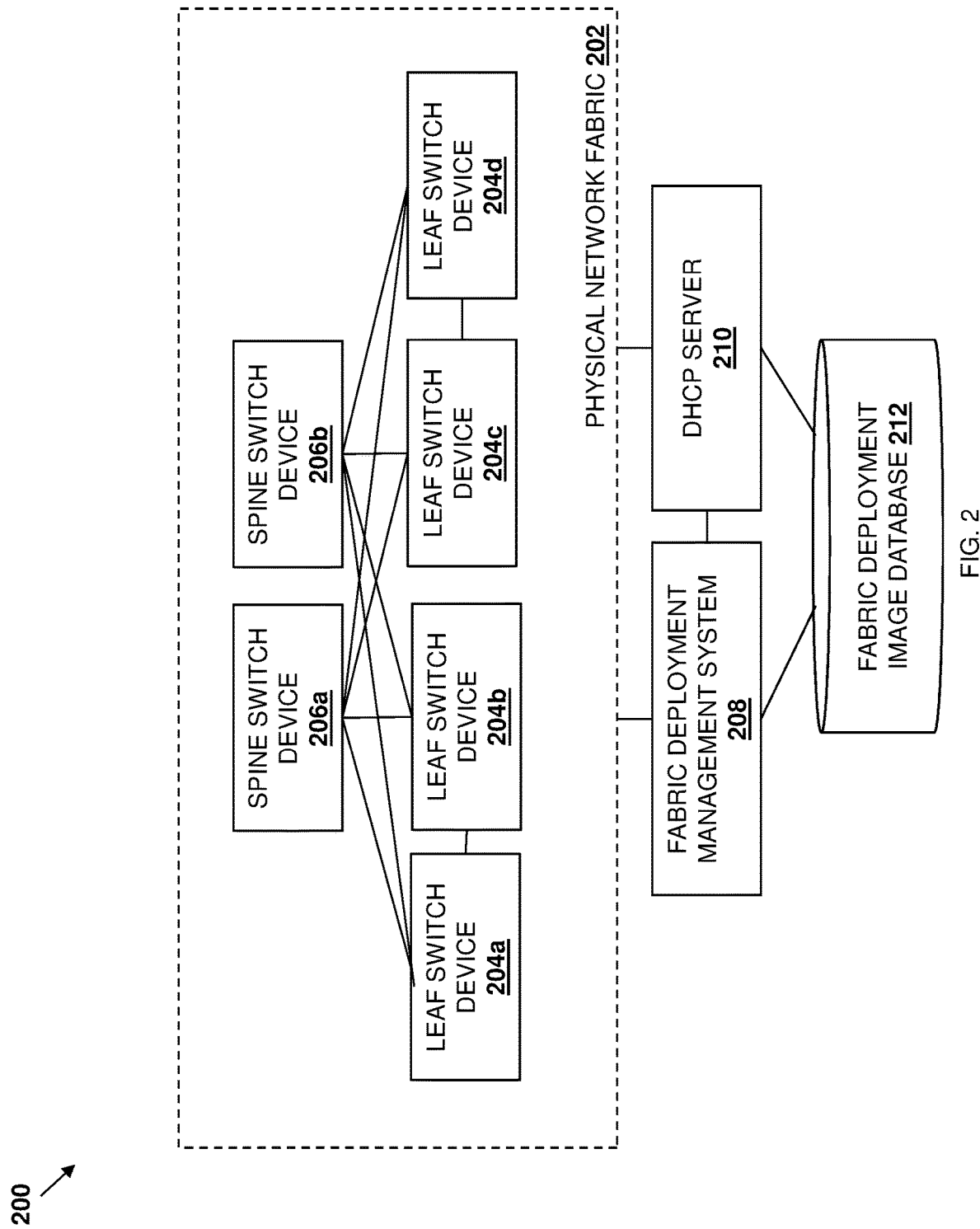
FIG. 2 is a schematic view illustrating an embodiment of the network fabric deployment system of the present disclosure.

Referring now to FIG. 2, an embodiment of a network fabric deployment system 200 is illustrated. In the illustrated embodiment, the network fabric deployment system 200 includes a physical network fabric 202 having a plurality networking devices such that a plurality of leaf switch devices 204a, 204b, 204c, and 204d illustrated in FIG. 2. In an embodiment, any or all of the leaf switch devices 204a-204d may be provided by the IHS 100 discussed above with reference to FIG. 1, and/or may include some or all of the components of the IHS 100, and in specific examples may be provided by Top of Rack (ToR) switch devices. However, while illustrated and discussed as being provided by leaf switch devices such that ToR switch devices, one of skill in the art in possession of the present disclosure will recognize that the network fabric deployment system 200 may include any networking device (e.g., a router device, a gateway device, a bridge device, and/or any other networking device that would be apparent to one of skill in the art in possession of the present disclosure) while remaining within the scope of the present disclosure. In the illustrated embodiment, pairs of leaf switch devices (e.g., the leaf switch devices 204a/204b and the leaf switch devices 204c/204d) may be coupled together by inter-switch links that may be provided by aggregated Inter-Chassis Links (ICLs) (also referred to as Virtual Link Trunking (VLT) interconnects (VLTi's) in the VLT protocol available in switch device provided by DELL® Inc. of Round Rock, Tex., United States), and/or other inter-switch connections that would be apparent to one of skill in the art in possession of the present disclosure.

In various embodiments, the leaf switch devices 204a and 204b may be coupled to a first set of host computing devices (not illustrated), and one of skill in the art in possession of the present disclosure will recognize that the connections between the leaf switch devices 204a/204b and host computing devices may be aggregated using, for example, the VLT protocol in order to provide an aggregated link (or "VLT port channel") between the leaf switch devices 204a/204b and the first set of host computing devices. Similarly, the leaf switch devices 204c and 204d may be coupled to a second set of host computing devices (not illustrated) and one of skill in the art in possession of the present disclosure will recognize that the connections between the leaf switch device 204c/204d and the second set of host devices may each be aggregated using, for example, the VLT protocol in order to provide an aggregated link (or "VLT port channel") between the leaf switch device 204c/204d and the second set of host computing devices.

In the illustrated embodiment, the physical network fabric 202 in the network fabric deployment system 200 also includes a pair of spine switch devices 206a and 206b, with the spine switch device 206a coupled to each of the leaf switch devices 204a, 204b, 204c, and 204d, and the spine switch device 206b coupled to each of the leaf switch devices 204a, 204b, 204c, and 204d as well. As will be appreciated by one of skill in the art in possession of the present disclosure, any connection between either of the spine switch devices 206a/206b and a leaf switch device 204a-204d may include one or more links that may be aggregated similarly as discussed above (e.g., according to the VLT protocol or other aggregation protocols known in the art). In various embodiments, each of the spine switch devices 206a and 206b may be coupled to a gateway device (not illustrated), and one of skill in the art will recognize that the spine switch devices 206a and 206b and/or the leaf witch devices 204a-204d may be coupled to many other types of computing devices as well. In an embodiment, either or both of the spine switch devices 206a and 206b may be provided by the IHS 100 discussed above with reference to FIG. 1, and/or may include some or all of the components of the IHS 100. However, while illustrated and discussed as being provided by spine switch devices, one of skill in the art in possession of the present disclosure will recognize that the network fabric deployment system 200 may include any networking device that would be apparent to one of skill in the art in possession of the present disclosure.

In the illustrated embodiment, the network fabric system 200 also includes a fabric deployment management system 208 that, while not explicitly illustrated in FIG. 2, may be coupled to any or all of the leaf switch devices 204a-204d and the spine switch devices 206a and 206b. In an embodiment, the fabric deployment management system 208 may be provided by the IHS 100 discussed above with reference to FIG. 1, and/or may include some or all of the components of the IHS 100, and may include one or more server devices. In a specific example, the fabric deployment management system 208 may be provided by a Smart Fabric Director (SFD) fabric deployment management system provided by DELL® Inc. of Round Rock, Tex., United States, and may be configured to perform a variety of fabric deployment management operations for the leaf switch devices 204a-204d, the spine switch devices 206a and 206b, and/or other networking devices in the physical network fabric 202. As will be appreciated by one of skill in the art in possession of the present disclosure, the fabric deployment management system 208 may be a fabric deployment orchestrator solution that enables network administrators to synchronize the deployment of a physical switch fabric with a virtual/cloud-based network and gain comprehensive visibility at both the physical and virtual network layers. However, while illustrated and discussed as being provided by a particular fabric deployment management system 208, one of skill in the art in possession of the present disclosure will recognize that the network fabric deployment system 200 may include any device that may be configured to operate similarly as the fabric deployment management system 208 discussed below (e.g., a Zero Touch Provisioning/Deployment (ZTP/ZTD) solution, a Bare Metal Provisioning (BMP) solution, and/or any other fabric deployment management system known in the art). It is noted that the process of bringing up a switch device in a network fabric that includes the installation of images, as well as the configurations and validations such that the switch device is functioning in the network fabric, may be referred to herein as "deployment" or "provisioning", and those terms may be used interchangeably.

In the illustrated embodiment, the physical network fabric 202 in the network fabric deployment system 200 also includes a Dynamic Host Configuration Protocol (DHCP) server device 210 that operates according to the DHCP protocol to dynamically assign Internet Protocol (IP) addresses and other networking parameters to the leaf switch devices 204a-204d, the spine switch device 206a and 206b, and/or any other networking device or computing device in the physical network fabric 202 in order to allow those networking devices/computing devices to be configured for network communication. In an embodiment, the DHCP server device 210 may be provided by the IHS 100 discussed above with reference to FIG. 1, and/or may include some or all of the components of the IHS 100, and in specific examples may be provided by one or more server devices. However, while illustrated and discussed as being provided by server device(s), one of skill in the art in possession of the present disclosure will recognize that the network fabric deployment system 200 may include any devices that may be configured to operate similarly as the DHCP server device 210 discussed below. In the illustrated embodiment, a fabric deployment image storage system (not illustrated, but which may include the storage 108 discussed above with reference to FIG. 1) may be coupled to the fabric deployment management system 208 and the DHCP server 210, and may include a fabric deployment image database 212 that may store any deployment image files obtained from deployed cloud-based networking devices on cloud-based network fabrics for deployment on physical networking devices on the physical network fabric 202. However, while a specific network fabric deployment system 200 has been illustrated and described, one of skill in the art in possession of the present disclosure will recognize that the network fabric deployment system of the present disclosure may include a variety of components and component configurations while remaining within the scope of the present disclosure as well.

Figure 3:
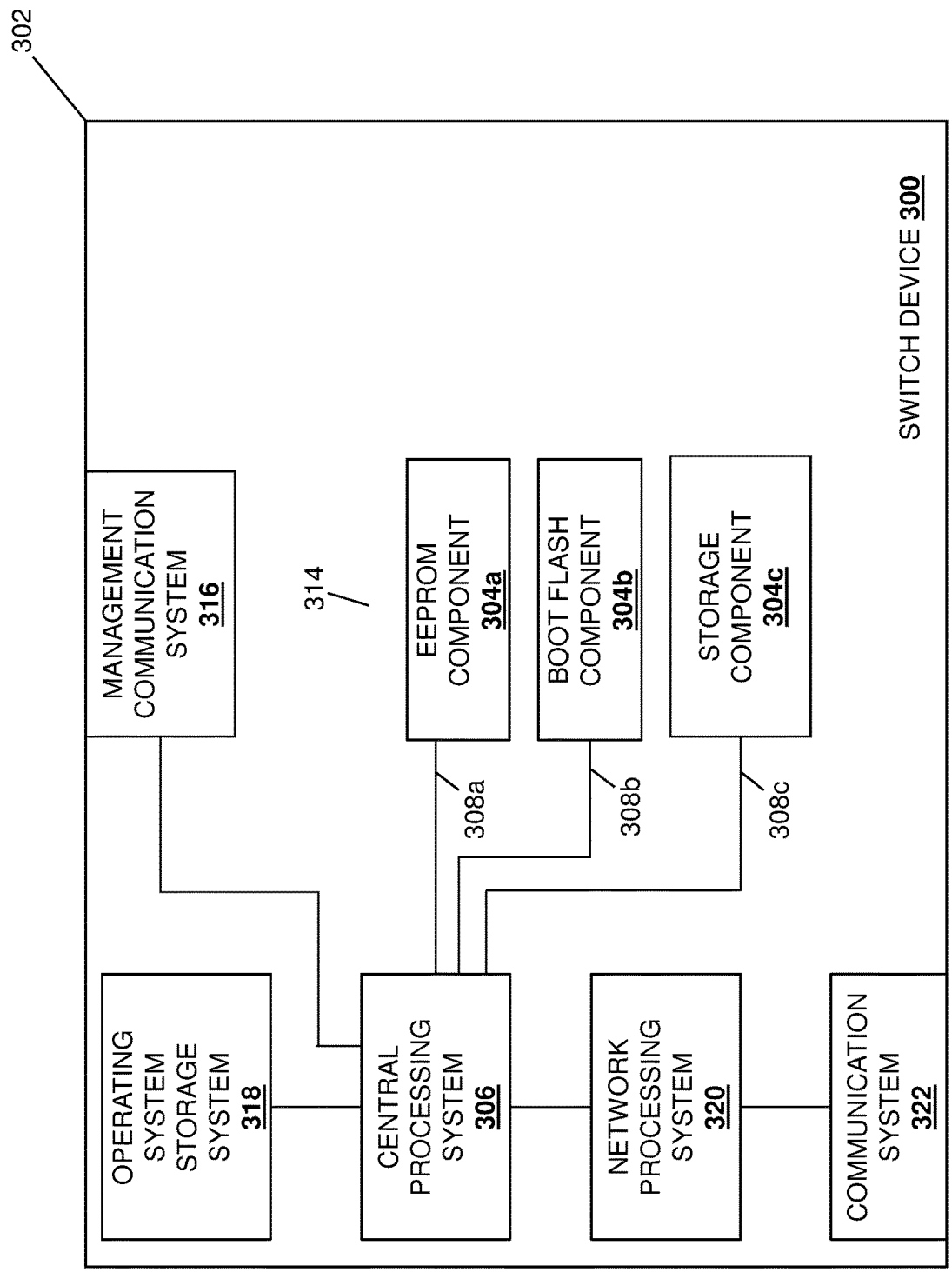
FIG. 3 is a schematic view illustrating an embodiment of a switch device that may be included in the network fabric deployment system of FIG. 2.

Referring now to FIG. 3, an embodiment of a switch device 300 is illustrated that may provide the leaf switch devices 204a-204d and the spine switch devices 206a and 206b discussed above with reference to FIG. 2. As such, the switch device 300 may be provided by the IHS 100 discussed above with reference to FIG. 1 and/or may include some or all of the components of the IHS 100. Furthermore, while illustrated and discussed as being provided by a switch device, one of skill in the art in possession of the present disclosure will recognize that the functionality of the switch device 300 discussed below may be provided by other networking device that are configured to operate similarly as the switch device 300 discussed below. In the illustrated embodiment, the switch device 300 includes a chassis 302 that houses the components of the switch device 300, only some of which are illustrated below.

For example, the chassis 302 may house a plurality of components that, in the illustrated embodiments below, include an EEPROM component 304a, a boot flash component 304b (e.g., a Basic Input/Output System), and a storage component 304c (e.g., an Open Network Install Environment (ONIE) and Solid State Drive (SSD)), and one of skill in the art in possession of the present disclosure will recognize that the chassis 302 may include a variety of other components (e.g., a Complex Programmable Logic Device (CPLD) component and an Field Programmable Gate Array (FPGA)) as well. In various embodiments, each of the components 304a-304c may be provided by dual-port components that maybe connected to different processing systems or controller systems (e.g., the two System on Chip (SoC)(s) in the examples provided below), and thus may utilize or otherwise implement any of a variety of dual-port technologies that would be apparent to one of skill in the art in possession of the present disclosure.

In the illustrated embodiment, a central processing system 306 is also included in the chassis 302. In an embodiment, the central processing system 306 may be provided by a host Central Processing Unit (CPU) System on Chip (SoC), and may be configured to perform ONIE operations, Network Operating System (NOS) operations, and/or other host CPU SoC operations that would be apparent to one of skill in the art in possession of the present disclosure. In the illustrated embodiment, the central processing system 306 is connected to a port on the EEPROM component 304*a* via a communication channel 308*a*, to a port on the boot flash component 304*b* via a communication channel 308*b*, and to a port on the storage component 304*c* via a communication channel 308*c*. In a specific example, the communication channel 308*a* may be provided by an Inter-Integrated Circuit (I2C) channel, the communication channel 308*b* may be provided by a Serial Peripheral Interface (SPI) channel, the communication channel 308*c* may be provided by Serial Attached Storage (SAS) or Peripheral Component Interconnect express (PCIe) channel, and the communication channel 308*d* may be provided by a Local Inter-Process (LPC), PCIe, or I2C channel. However, while the central processing system 306 is described as connected to the components 304*a*-304*c* via particular communication channels, one of skill in the art in possession of the present disclosure will recognize that a variety of connections/communication channels may be provided between a central processing system and dual port components while remaining within the scope of the present disclosure as well.

As illustrated in FIG. 3, a management communication system 316 may be coupled to each of the central processing system 306 and, as discussed below, may provide access to a management network that provides the fabric deployment management system 208 and the DHCP server 210 discussed above with reference to FIG. 2 and that is accessible via management port(s) on the switch device 300. In the illustrated embodiment, an operating system storage system 318 is included in the chassis 302 and coupled to the central processing system 306 (e.g., via a SATA or PCIe connector), and may be provided by an SSD that stores a Network Operating System (NOS) utilized by the switch device 300, as well as other disk partitions such as, for example, a third-party container partition, an open source container services partition, and/or any other partitions that would be apparent to one of skill in the art in possession of the present disclosure. In some embodiments, the storage component 304*c* may be provided by the operating system storage system 318. As such, the NOS and the ONIE may be included on the operating system storage system 318.

Furthermore, a network processing system 320 is coupled to the central processing system 306 and may be provided by a Network Processing Unit (NPU)/Application Specific Integrated Circuit (ASIC) complex (e.g., including Media Access Control (MAC) and physical layer (PHY) components), with the network processing system 320 coupled to a communication system 322 that provides switch ports on the switch device 302 that are connected to a host network that is part of the network fabric 202 discussed above with reference to FIG. 2. However, while a specific switch device 300 has been illustrated and described, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
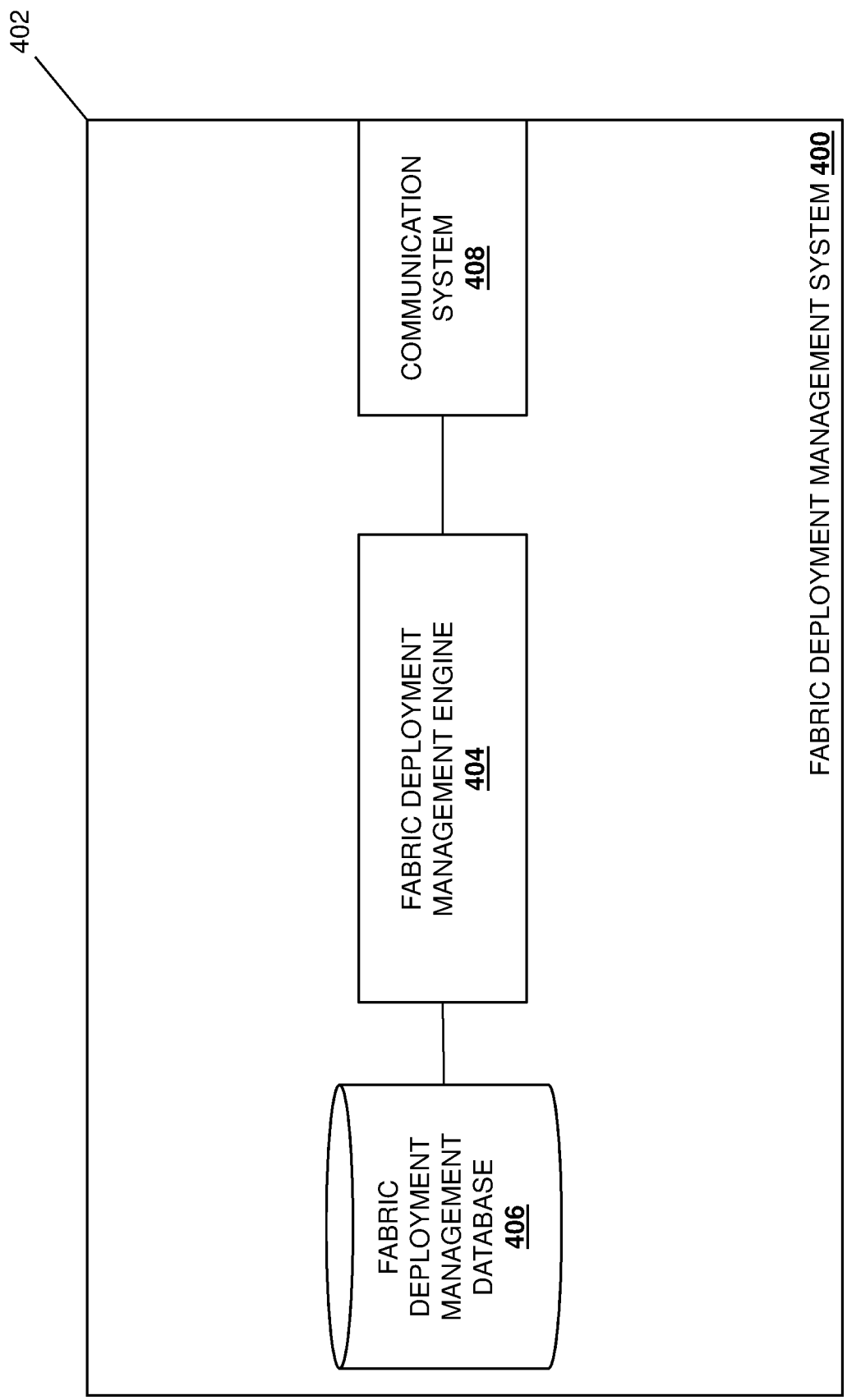
FIG. 4 is a schematic view illustrating an embodiment of a fabric deployment management system that may be included in the network fabric deployment system of FIG. 2.

Referring now to FIG. 4, an embodiment of a fabric deployment management system 400 is illustrated that may provide the fabric deployment management system 208 discussed above with reference to FIG. 2. As such, the fabric deployment management system 400 may be provided by the IHS 100 discussed above with reference to FIG. 1 and/or may include some or all of the components of the IHS 100, and in specific examples may be provided by an SFD fabric deployment management system available from DELL® Inc. of Round Rock, Tex., United States. Furthermore, while illustrated and discussed as a particular fabric deployment management system, one of skill in the art in possession of the present disclosure will recognize that the functionality of the fabric deployment management system 400 discussed below may be provided by other devices that are configured to operate similarly as the fabric deployment management system 400 discussed below. In the illustrated embodiment, the fabric deployment management system 400 includes a chassis 402 that houses the components of the fabric deployment management system 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a fabric deployment management engine 404 that is configured to perform the functionality of the fabric deployment management engines and/or fabric management systems discussed below.

The chassis 402 may also house a storage device (not illustrated, but which may include the storage device 108 discussed above with reference to FIG. 1) that is coupled to the fabric deployment management engine 404 (e.g., via a coupling between the storage device and the processing system) and that provides a fabric deployment management database 406 that may store any of the information utilized by the fabric deployment management engine 404 discussed below. In various embodiments, the fabric deployment management database 406 may include some or all of the fabric deployment image database 212 of FIG. 2. The chassis 402 may also house a communication system 408 that is coupled to the fabric management engine 504 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific fabric deployment management system 400 has been illustrated and described, one of skill in the art in possession of the present disclosure will recognize that fabric management systems (or other devices operating according to the teachings of the present disclosure in a manner similar to that described below for the fabric management system 400) may include a variety of components and/or component configurations for providing conventional fabric management system functionality, as well as the functionality discussed below, while remaining within the scope of the present disclosure as well.

Referring now to FIG. 5, an embodiment of a method 500 for deploying provisioned networking device images on physical networking devices in a physical network fabric is illustrated. As discussed below, the systems and methods of the present disclosure provide a fabric deployment management system that uses a networking device inventory of a physical network fabric that is connected based on a physical fabric topology (or that will be connected based on an intended physical fabric topology) to duplicate the physical network fabric in a cloud-based network fabric using virtual networking devices that include a virtual NOS, a virtual ONIE, and a customized partition table to orchestrate and validate the deployment of the networking devices in the cloud-based network fabric. Once the cloud-based network fabric is configured and validated, the fabric deployment management system may extract partitions and configuration files from each cloud-based switch device to create a deployment image file (e.g., BLOB storage) which will be used by the BIOS via a iPXE and/or the ONIE of each physical switch device in the physical network fabric to reconstruct and flash the pre-validated storage partition data, load a specific curated NOS image for that physical switch device which identifies that it booted from a pre-validated partition, expands the storage partition, and updates a Master Boot Record (MBR) or a Globally Unique Identifiers (GUID) Partition Table (GPT) to boot into the NOS directly on subsequent reboots. As such, the network fabric deployment system of the present disclosure reduces physical fabric deployment/rollback time by making deployment of physical switch devices more predictable, while isolating hardware issues during switch device replacement or during installation of a new network fabric via the use of networking device images and configurations that have already been provisioned in a cloud-based network fabric.

The method 500 begins at block 502 where the fabric deployment management system obtains a networking fabric inventory that includes physical networking device identifiers that each uniquely identify a physical networking device in a physical network fabric. In an embodiment, at block 502, the fabric deployment management system 208 may obtain a networking device inventory of the physical network fabric 202, or a networking device inventory of networking devices that are to be deployed to create the physical network fabric 202. The networking device inventory may include networking device information about the networking devices included in the physical network fabric 202. For example, the networking device information may include networking devices identifiers that identify each of the leaf switch devices 204a-204d and each of the spine switch devices 206a and 206b. However, one of skill in the art in possession of the present disclosure will recognize that other networking device information may be obtained by the fabric deployment management system 208 at block 502 while falling under the scope of the present disclosure. In a specific example, the physical networking device identifiers may include a service tag, a serial number, a base Media Access Control (MAC) address, and/or any other networking device identifier that would be apparent to one of skill in the art in possession of the present disclosure. Furthermore, the physical networking devices identifier(s) identifying a networking device and included in the networking device information may be stored in the EEPROM component 304a of that networking device (e.g., the switch device 300).

Figure 6A:
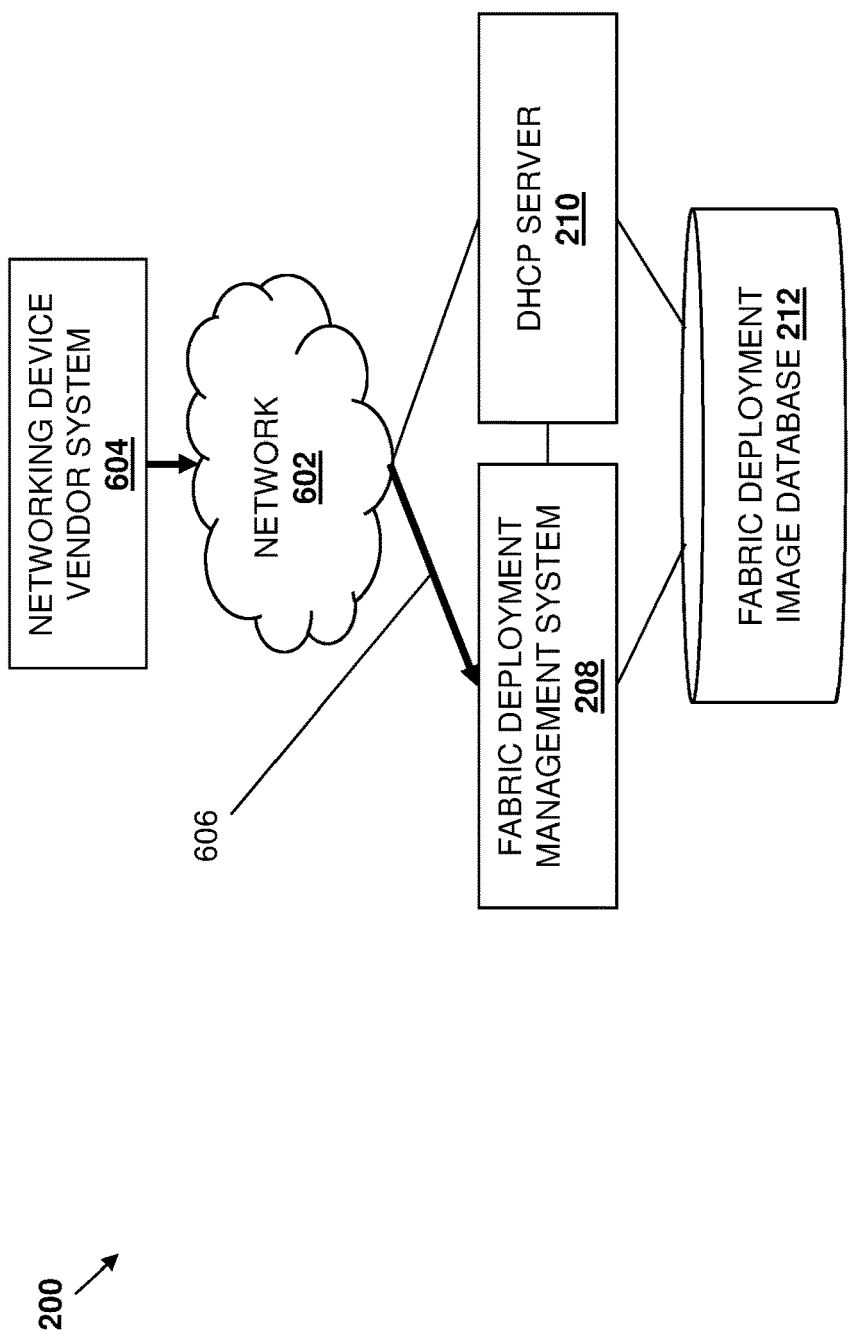
FIGS. 6A-6O are is schematic views illustrating an embodiment of the network fabric deployment system of FIG. 2 including the switch device of FIG. 3 and the fabric deployment management system of FIG. 4 operating during the method of FIG. 5.
Figure 6B:
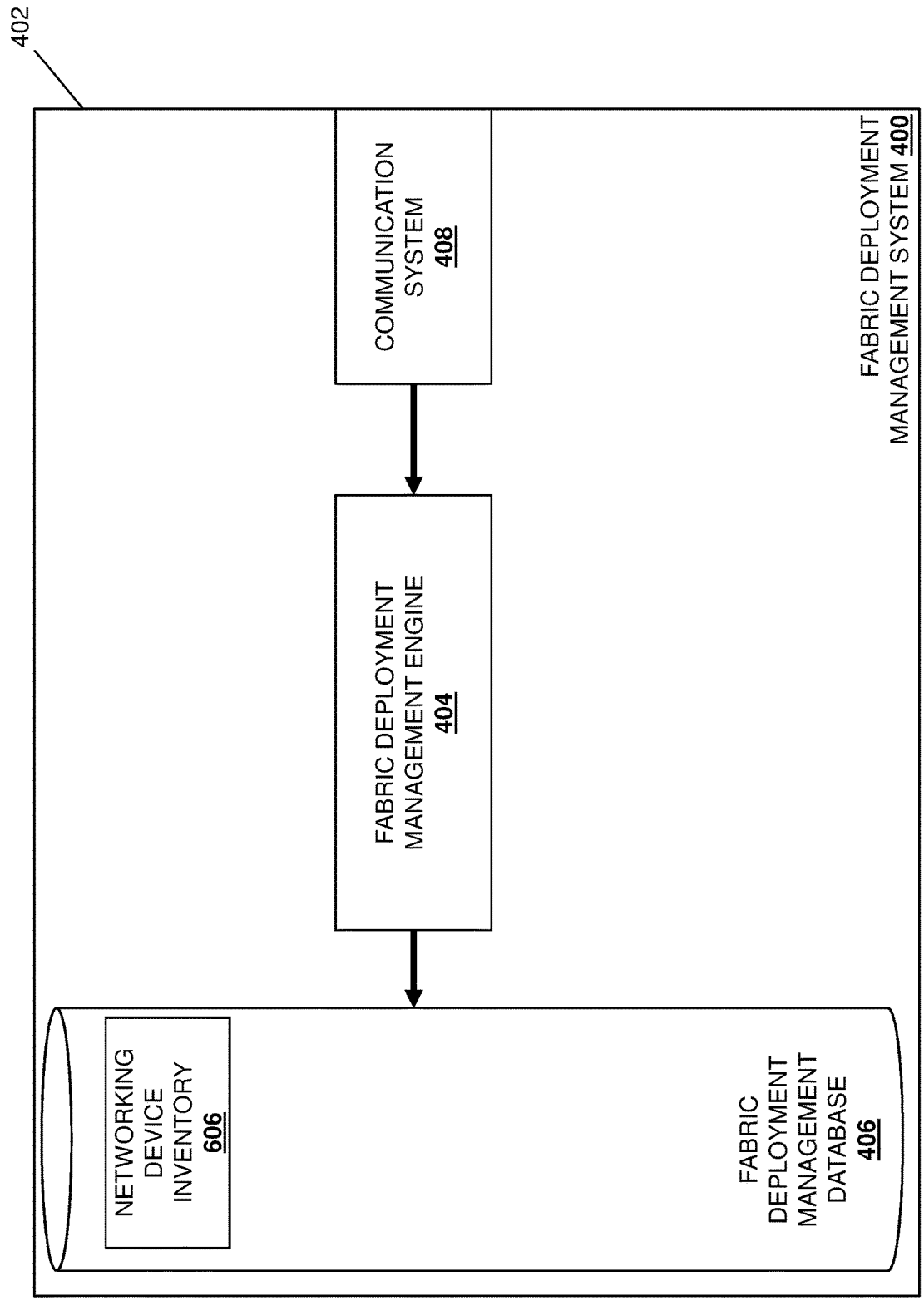

In various embodiments, the fabric deployment management system 208 may obtain the networking device inventory of the physical network fabric 202 through various mechanisms. With reference to FIG. 6A, the fabric deployment management system 208 may be coupled to a networking device vendor system 604 via a network 602, and may receive a networking device inventory file 606 from the networking device vendor system 604 at block 502 (as indicated by the bolded arrow). For example, a networking device vendor associated with the networking device vendor system 604 may have shipped (or may be scheduled to ship) the leaf switch devices 204a-204d and/or the spine switch device 206a and 206b to the customer or other user of the physical network fabric 202 and the fabric deployment management system 208. As such, the customer and/or other user of the leaf switch devices 204a-204d and/or the spine switch device 206a and 206b is often given the networking device inventory prior to that customer racking/connecting the networking devices to form the physical network fabric 202. In other examples, the customer may input the networking device inventory at the fabric deployment management system 208 and/or via any other mechanism that would be apparent to one of skill in the art in possession of the present disclosure. With reference to FIG. 6B, the fabric deployment management system 208/400 may store the networking device inventory 606 in the fabric deployment management database 406 (as indicated by the bolded arrows).

Figure 6C:
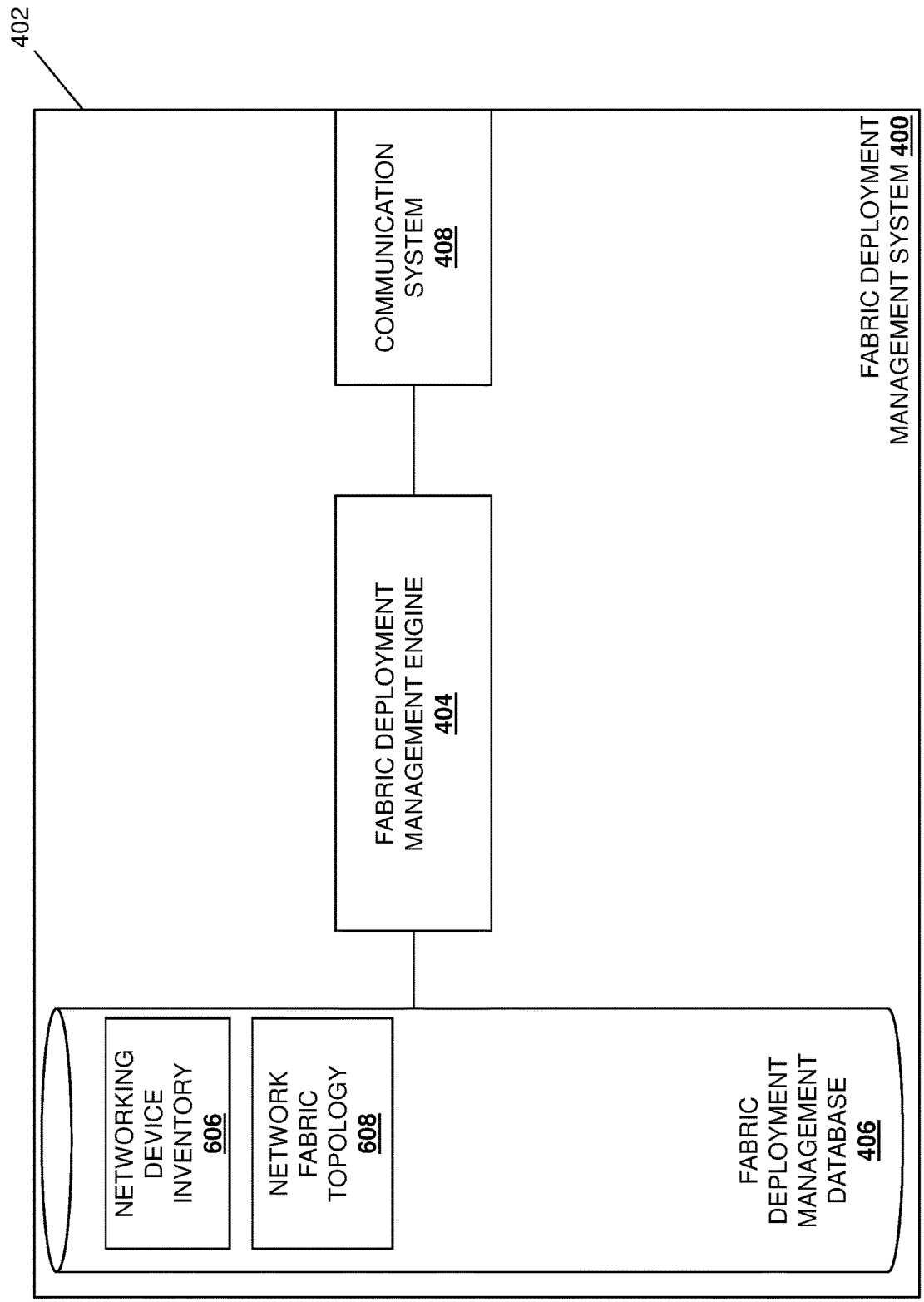

The method 500 then proceeds to block 504 where a physical network topology is obtained. In an embodiment, at block 504, the fabric deployment management system 208 may obtain network fabric topology of that includes a wiring diagram of the physical network fabric 202. For example, the fabric deployment management engine 404 in the fabric deployment management system 208/400 may include a fabric design application that the administrator may use to design the physical network fabric 202, and/or may be configured to access a fabric design application via the network 602 of FIG. 6A. For example, the fabric design application may be provided by Dell EMC Fabric Design Center (FDC) available from DELL® Inc. of Round Rock, Tex., United States, which one of skill in the art in possession of the present disclosure will recognize is a cloud-based application that automates the planning, design, and deployment of network fabrics that enable compute, storage, and hyper-converged infrastructure solutions. As such, fabric design applications like the FDC provide solutions and automation based on validated deployment guides, and allow design customization and flexibility for physical network fabrics to go beyond simple validated deployment guides. In various embodiments, a network fabric topology file created or received by the fabric deployment management system 208 may be provided in a JavaScript Object Notation (JSON) format. With reference to FIG. 6C, a network fabric topology file 608 that includes the physical network topology may be stored by the fabric deployment management system 208/400 in the fabric deployment management database 406 as well.

The method 500 then proceeds to block 506 where a network fabric provisioning plan is generated. In an embodiment, at block 506, the fabric deployment management system 208 may generate or obtain a network fabric provisioning plan for each of the networking devices in the physical network fabric 202, and that network fabric provisioning plan may define a series of configuration and validation steps for each networking device (e.g., the leaf switch devices 204a-204d and the spine switches 206a and 206b) in the physical network fabric 202 that provide for the deployment of that networking device from a bare-metal state to a deployed state. For example, the network fabric provisioning plan for each networking device may define a series of image upgrades, service upgrades, container upgrades, configuration steps, validation steps, and/or any other provisioning steps that one of skill in the art of the present disclosure would recognize are required to provision/deploy that particular networking device from a bare-metal state to a deployed state. In specific examples, the configurations may include Virtual Link Trunking (VLT) configurations, Equal-Cost MultiPath (ECMP) configurations, L2 Virtual Extensible Local Area Network (VXLAN), L3 Boarder Gateway Protocol (BGP) Ethernet Virtual Private Network (EVPN) VXLAN configurations, and/or any other configurations that would be apparent to one skilled in the art in possession of the present disclosure. In specific examples, the validation steps may include tools like Batfish to check Free Range Routing (FRR) and/or any other validations that would be apparent to one of skill in the art in possession of the present disclosure.

Figure 6D:
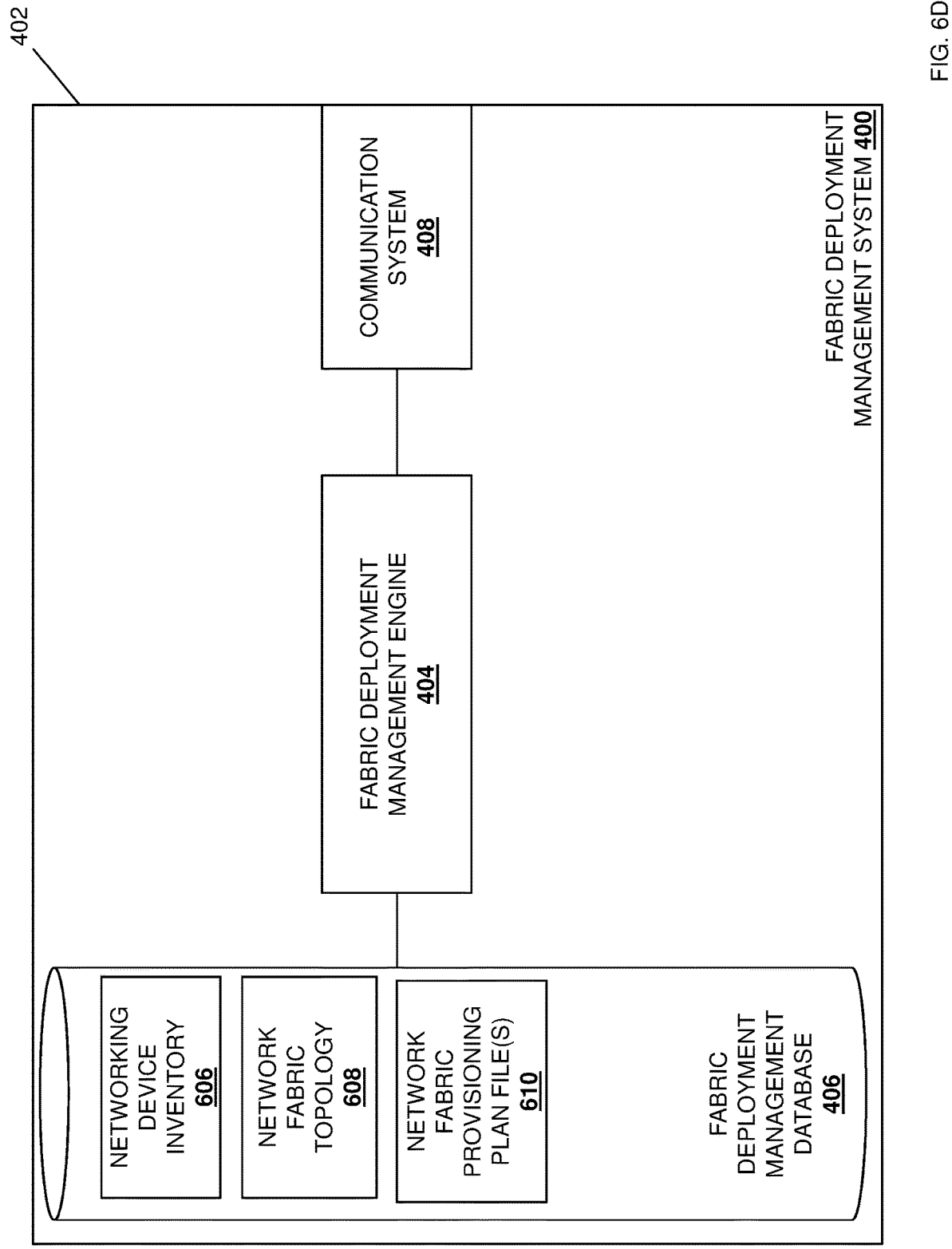

In various embodiments, each network fabric provisioning plan may be keyed/associated with the physical networking device identifier of the networking device for which the network fabric provisioning plan was generated. In a specific examples, the administrator may create (via the fabric deployment management engine 404 of the fabric deployment management system 208/400) a network fabric provisioning plan file (e.g., <switch-service-tag>_provisioning_sfd.json) for every switch device (e.g., the leaf switch devices 204a-204d and the spine switches 206a and 206b) in the planned network fabric topology, and the <switch-service-tag>_provisioning_sfd.json may be created and/or edited individually or in a bulk mode. With reference to FIG. 6D, network fabric provision plan file(s) 610 that include each fabric provision plan may be stored by the fabric deployment management system 208/400 in the fabric deployment management database 406 as well.

The method 500 then proceeds to block 508 where cloud partitions are obtained. In an embodiment, at block 508, the fabric deployment management system 208 may obtain cloud partition files. The cloud partition files may be bundled with the network fabric provisioning plan or imported during runtime. For example, a cloud partition for a particular physical networking device (e.g., a particular platform type) may be provided by a cloud partition file in a JSON format. The cloud partitions may include partition meta data for each networking device type that will be provisioned virtually in a cloud-based network fabric for the purpose of generating validated partitions, and the partition meta data may include partition numbers, a Universally Unique Identifier (UUID), a disk label, a type of partition, a size of each partition, and/or any other meta data that would be apparent to one of skill in the art in possession of the present disclosure. In various embodiments, the partition size included in the partition meta data for the cloud partitions may be a scaled-down version of what an expected partition size would be in a corresponding physical networking device. For example, a cloud partition file provided by "cloud_partitions.json" for a PowerSwitch S5248 available from DELL® Inc. of Round Rock, Tex., United States, may include:

{/dev/sda3: LABEL="SONiC-OS" UUID="d4cd2990-. . . ." TYPE="ext4" START=788480 SIZE=1 GB,
/dev/sdb1: LABEL="OPEN-CONTAINERS" UUID="4595df75- . . . " TYPE="ext4" START=2430976 SIZE=64 MB,
/dev/sdb2: LABEL="TP-CONTAINERS" UUID="ae6b40ef- . . . " TYPE="ext4" START=21264384 SIZE=128 MB}

Figure 6E:
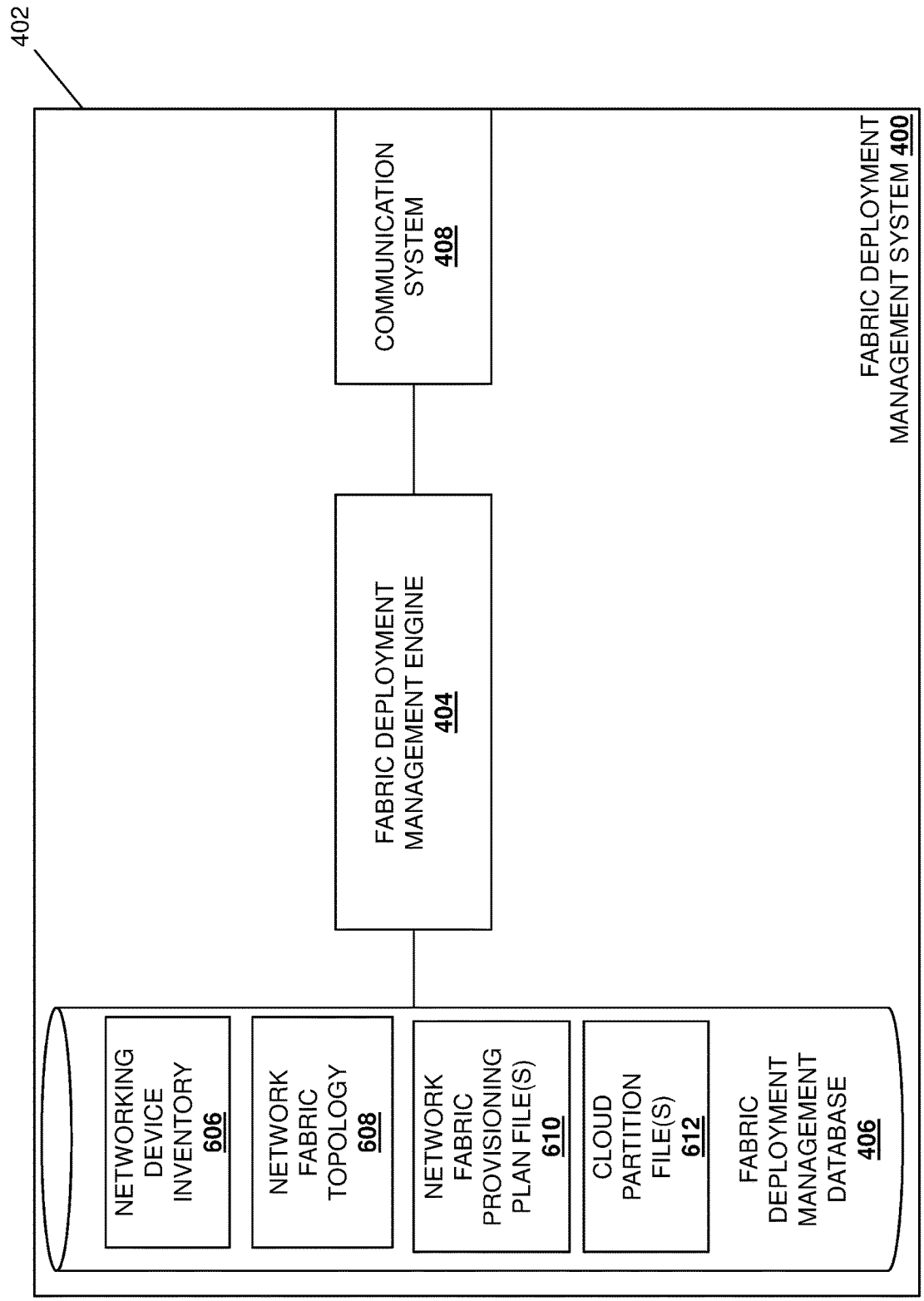

One of skill in the art will recognize that the example cloud partition file above defines that, in the cloud-based fabric network, the fabric deployment management system 208 should provision an OS (e.g., SONiC-OS) with just 1 GB of disk space, an open source container service (e.g., OPEN-CONTAINERS) in 64 MB of disk space, and third-party containers (e.g., TP-CONTAINERS) in 128 MB of disk space. With reference to FIG. 6E, cloud partition file(s) 612 may be stored by the fabric deployment management system 208/400 in the fabric deployment management database 406 as well.

The method 500 then proceeds to block 510 where a customized cloud partition is derived for each cloud-based networking device. In an embodiment, at block 510, the fabric deployment management system 208 may derive a customized cloud partition for each of the cloud-based networking devices (e.g., that may provide virtualized versions of the leaf switch devices 204a-204d and virtualized versions of the spine switches 206a and 206b). For example, the fabric management system 208 may derive each customized cloud partition file from the cloud partition file and the network fabric provisioning plan file for that networking device. Continuing with the specific example above, the <switch-service-tag>_provisioning_sfd.json obtained in block 506 may link/import to a customized cloud partition file (e.g., <switch-service-tag>_<platform>_cloud_partitions.json), which is derived from <platform>_cloud_partitions.json (e.g., the cloud partition). Furthermore, the fabric deployment management system 208 may be able to adjust the partition sizes of the specific cloud-based networking device based on the projected networking device customizations. For example, the administrator may adjust the <ToR-2/LEAF>_S5248_cloud_partitions.json based on the image sizes and number of containers/services that are planned to be installed on one of the virtualized leaf switch devices 204a-204d included in the cloud-based network fabric to provide the following:

{/dev/sda3: LABEL="SONiC-OS" UUID="d4cd2990-. . . ." TYPE="ext4" START=788480 SIZE=512 MB,
/dev/sdb1: LABEL="OPEN-CONTAINERS" UUID="4595df75- . . . " TYPE="ext4" START=2430976 SIZE=128 MB,
/dev/sdb2: LABEL="TP-CONTAINERS" UUID="ae6b40ef- . . . " TYPE="ext4" START=21264384 SIZE=128 MB}

Figure 6F:
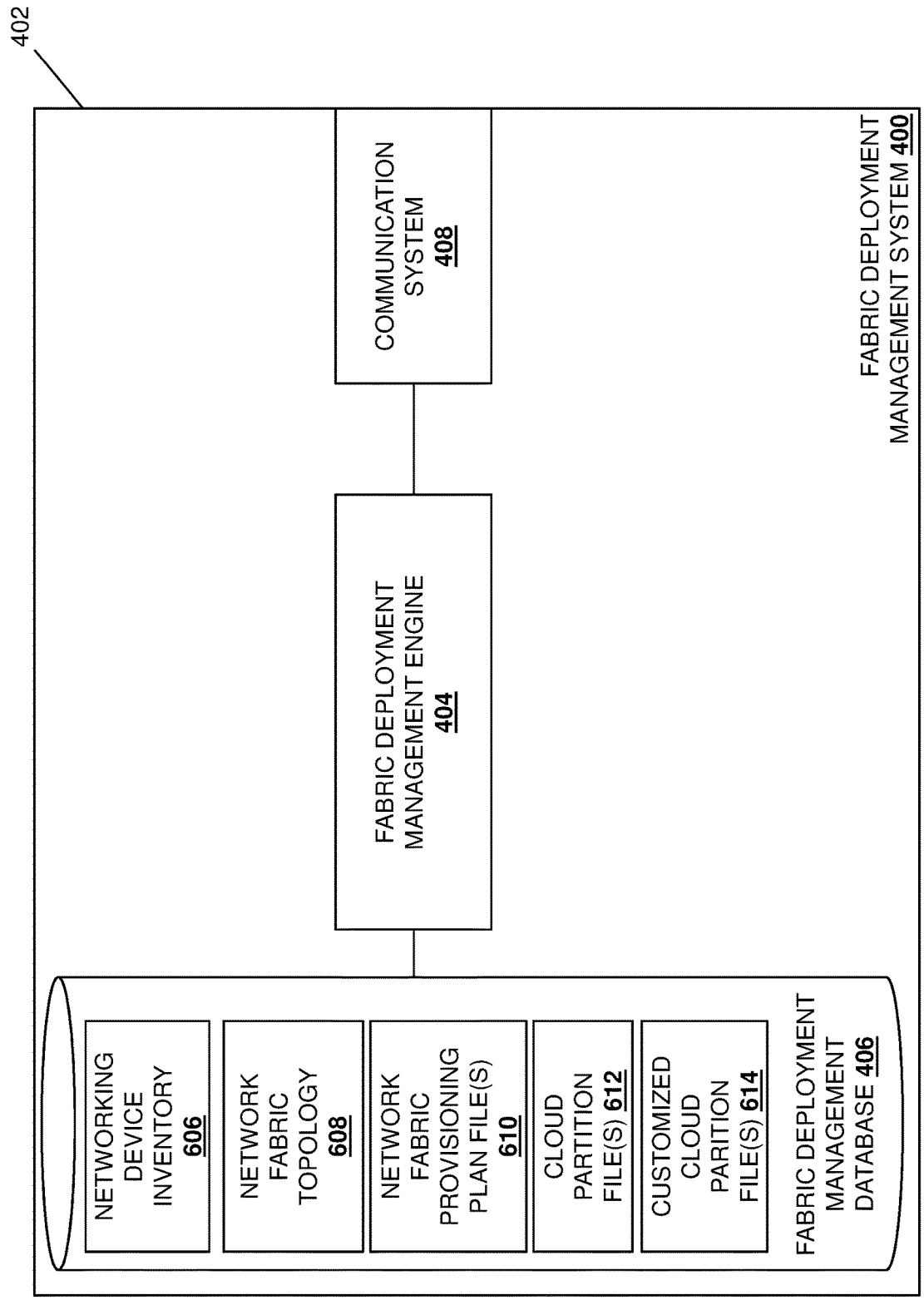

As will be appreciated by one of skill in the art in possession of the present disclosure, based on the example, above, the fabric deployment management system 208 should provision an OS (e.g., SONIC-OS) on a virtual disk with just 512 MB of disk space instead of 1 GB, and an open source container service (e.g., OPEN-CONTAINERS) on the virtual disk with 128 MB of disk space instead of 64 MB. With reference to FIG. 6F, the customized cloud partition file(s) 614 may be stored by the fabric deployment management system 208/400 in the fabric deployment management database 406 after being generated by the fabric deployment management engine 404 using the network fabric provisioning plan files 610 and the cloud partition files 612.

Figure 6G:
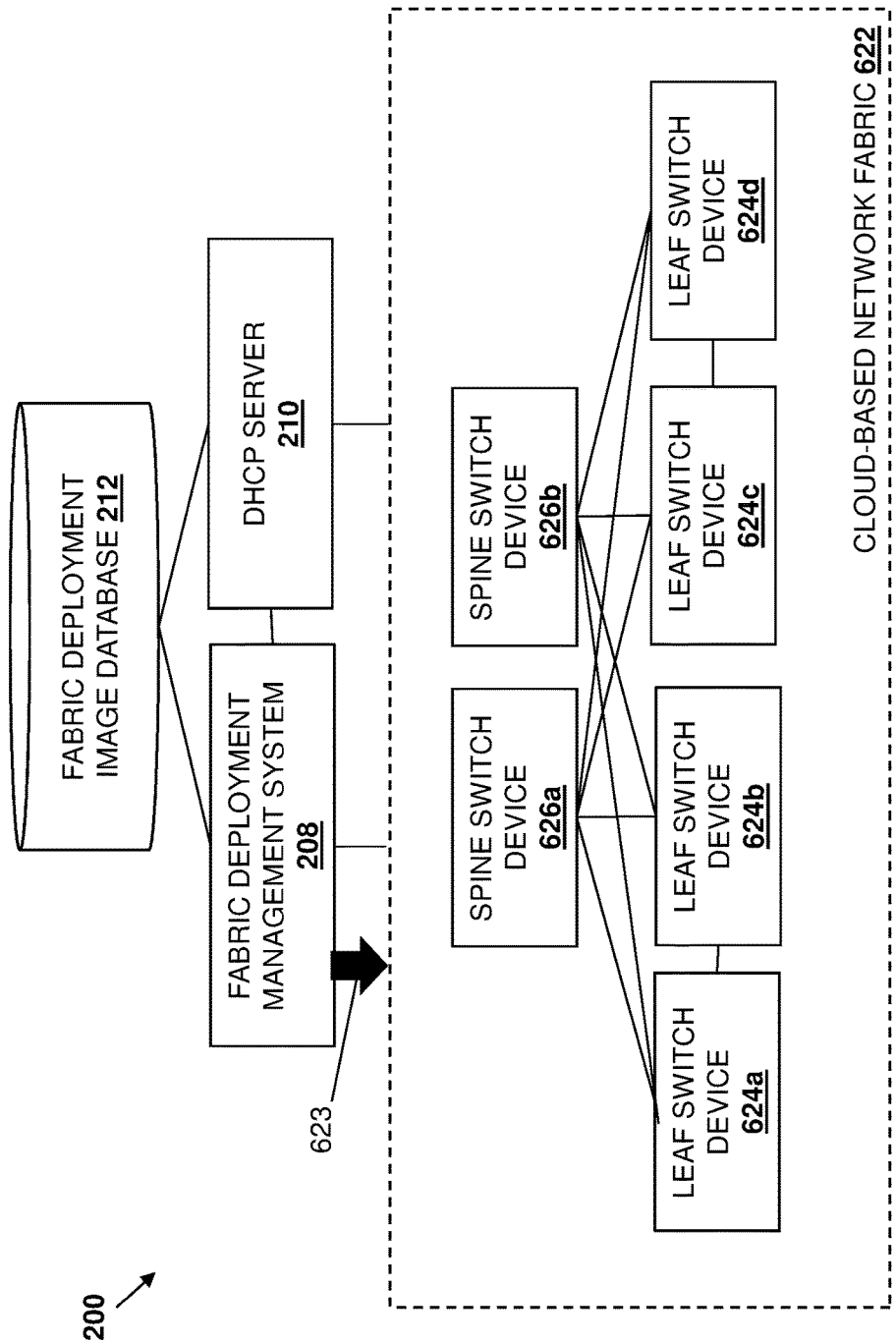

The method 500 then proceeds to block 512 where the fabric deployment management system creates a cloud-based network fabric. In an embodiment, at block 512 and with reference to FIG. 6F, the fabric deployment management system 208/400 may use the networking device inventory 606, the network fabric topology 608, the network fabric provisioning plan file(s) 610, and the customized cloud partition file(s) 614, to generate a cloud-based network fabric that corresponds to the physical network fabric 202 of FIG. 2. For example, the fabric deployment management engine 404 may cause "bare-metal" virtual networking devices to "spin-up" in a cloud-based/virtual environment, and each cloud-based networking device may be configured according to the networking device inventory 606 and the network fabric topology 608. In some examples, the network fabric provisioning files 610 may be executed by the fabric deployment management engine 404 to cause each virtual networking device to provision itself according to its specific provisioning plan. With reference to FIG. 6G, the fabric deployment management system 208 may create the cloud-based network fabric 622 (as indicated by bolded arrow 623). As illustrated, the cloud-based network fabric 622 may include a virtual leaf switch device 624*a* that corresponds with the leaf switch device 204*a* of FIG. 2, a virtual leaf switch device 624*b* that corresponds with the leaf switch device 204*b* of FIG. 2, a virtual leaf switch device 624*c* that corresponds with the leaf switch device 204*c*, a virtual leaf switch device 624*d* that corresponds with the leaf switch device 204*d* of FIG. 2, a virtual spine switch device 626*a* that corresponds with the spine switch device 206*a* of FIG. 2, and a virtual spine switch device 626*b* that corresponds with the spine switch device 206*b* of FIG. 2.

During the provisioning of the cloud-based networking devices, the ONIE may be installed on a virtualized storage component that is comparable to the storage component 304*c* in the switch device 300 of FIG. 3. The ONIE (in "virtual switch mode") may obtain an IP address from the DHCP server 210 according to a conventional DHCP process and based on the physical networking device identifier (e.g., a service tag) for that networking device identified in the networking device inventory that the corresponding physical networking device would eventually use from the EEPROM component 304*a* to obtain an IP address from the DHCP server 210 when that corresponding physical networking device is installed at the customer location. The ONIE may also obtain the customized cloud partition file 614 (e.g., <switch-service-tag>_<platform>_cloud_partitions.json) for that ONIE's particular networking device as part of the DHCP response. As discussed above, at least a portion of the fabric deployment management database 406 in the fabric deployment management system 208/400 may be provided on the fabric deployment image database 212, which is accessible by the DHCP server 210. As such, the DHCP server 210 may provide the customized cloud partition file 614 associated with the physical networking device identifier as part of a DHCP response/acknowledgement that includes an IP address associated with the physical networking device identifier. Furthermore, the fabric deployment management system 208/400 and/or the virtualized networking device may use the customized cloud partition file 614 during the ONIE-NOS-install process to create disk partitions for the cloud provisioning of that cloud-based networking device. The fabric deployment management system 208 and the cloud-based networking devices included in the cloud-based network fabric may then follow that cloud-based networking device's network fabric provisioning plan 610 until that cloud-based networking device is deployed in a manner that allows that cloud-based networking device to perform networking actions on data traffic.

Figure 6H:
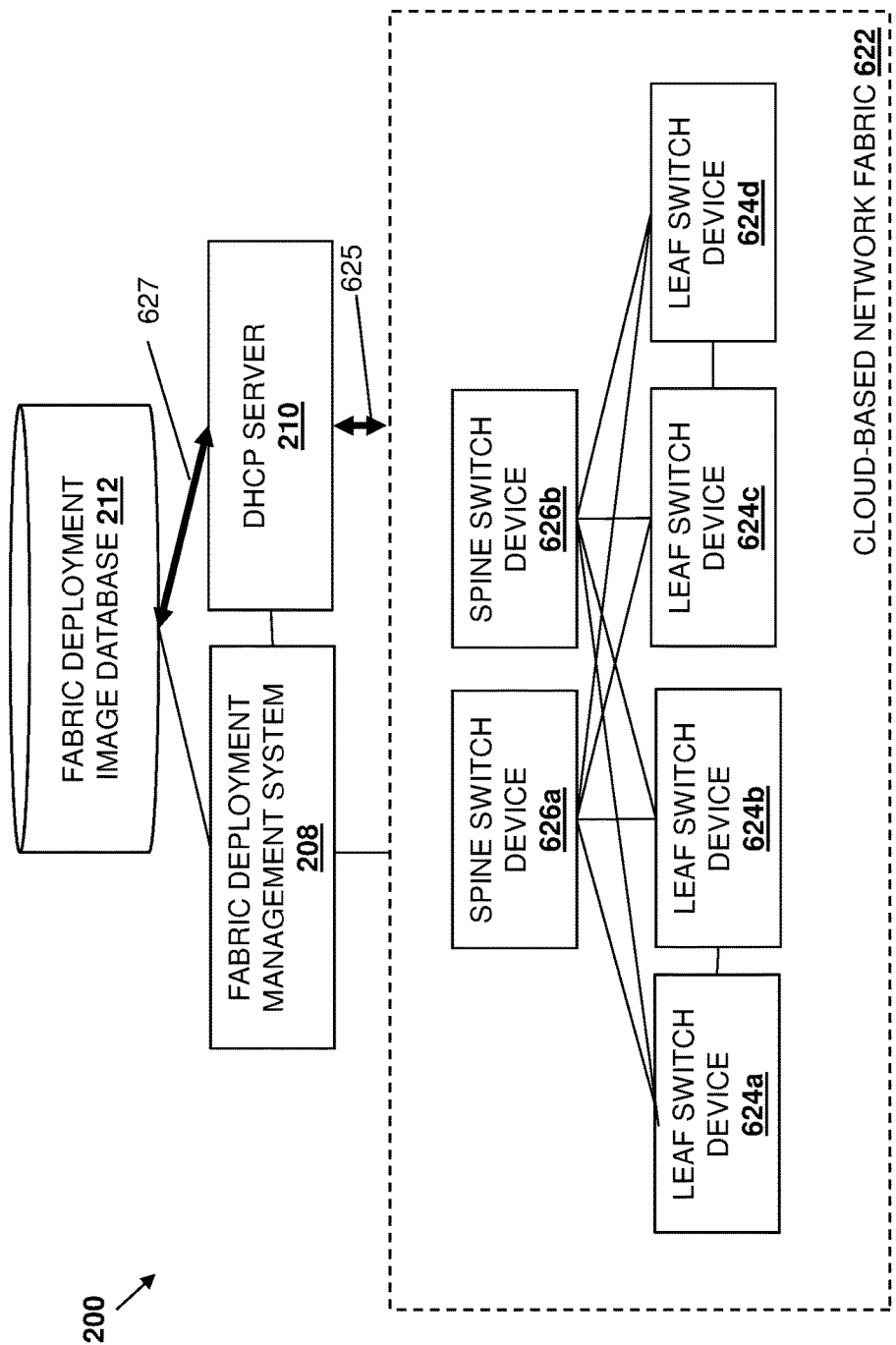

With reference to FIG. 6H, the ONIE on each of the virtual leaf switch devices 624*a*-624*d* and the virtual spine switch devices 626*a* and 626*b* may initiate a DHCP process with the DHCP server 210 (as indicated by bolded arrow 625). The DHCP requests may include the physical networking device identifier for the corresponding virtual leaf switch devices 624*a*-624*d*, the virtual spine switch device 626*a*, or the virtual spine switch device 626*b*. Each of the virtual leaf switch devices 624*a*-624*d* or the virtual spine switch devices 626*a* or 626*b* may then receive a DHCP acknowledgement/response that includes the IP address that is now associated with its physical networking device identifier as part of the DHCP registration by the DHCP server 210, and may receive its customized cloud partition file 614 (as indicated by bolded arrow 627) that the DHCP server 210 retrieved from the fabric deployment image database 212. Each virtual leaf switch devices 624*a*-624*d* and each virtual spine switch devices 626*a* and 626*b* (in combination with the fabric deployment management system 208) may follow the network fabric provisioning plan file(s) 610 for each switch device until each virtual leaf switch devices 624*a*-624*d* and each virtual spine switch devices 626*a* and 626*b* is deployed in a manner that allows that switch device to perform networking actions on network traffic.

The method 500 then proceeds to block 514 where a deployment image file is retrieved from each of the plurality of cloud-based networking devices that have been deployed. In an embodiment, at block 514, once the fabric deployment management system 208 completes the validations of the cloud-based networking devices to form the cloud-based network fabric that is representative of a deployed (or a to-be deployed) physical network fabric 202, the fabric deployment management system 208 may retrieve a deployment image file from each of the cloud-based networking devices, where each deployment image file includes a deployment image of that cloud-based networking device that has been deployed, any meta data for the deployment image, a configuration file, and/or any other data that would be apparent to one of skill in the art in possession of the present disclosure.

For example, the fabric deployment management system 208 may cause each of the cloud-based networking devices to dump their virtual disk partitions, which are a culmination of the sequence of orchestrated image/package/container upgrades, as well as configurations that occurred according to that cloud-based networking device's network fabric provisioning plan. In a specific example, the deployment image included in the deployment image file may include partition data objects (e.g., Binary Large Objects (BLOBs)): <switch-service-tag>_<UUID1>.blob, <switch-service-tag>_<UUID1>.blob, . . . and up to <switch-service-tag>_<UUIDn>.blob, from each cloud-based networking device (e.g., each of the plurality of cloud partitions on a single cloud-based networking device). The partition data objects may map to entries in the customized cloud partition file (e.g., <switch-service-tag>_<platform>_cloud_partitions.json), and the mapping may be made via the physical networking device identifier (e.g., the service tag). Furthermore, the fabric deployment management system 208 may also extract a configuration file (e.g., a GRand Unified Bootloader (GRUB) configuration file) that is included in the deployment image file. For example, the fabric deployment management system 208 may extract the <switch-service-tag>_grub.config for each cloud-based networking device. However, while certain deployment images and configurations files are discussed as being provided in the deployment image file, one of skill in the art in possession of the present disclosure will recognize that other information to provision a physical networking device may be included in the deployment image file without departing from the scope of the present disclosure.

Figure 6I:
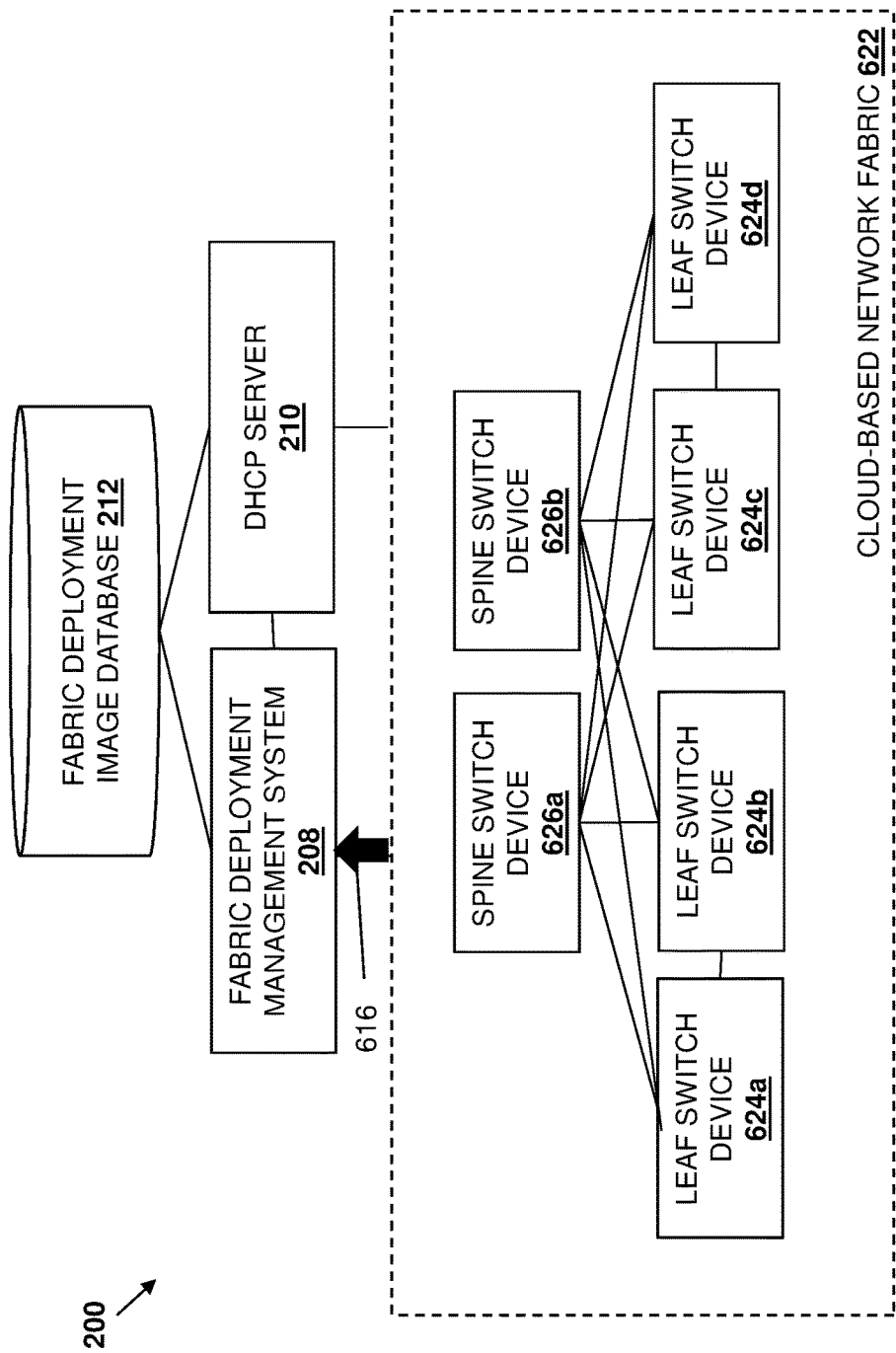

With reference to FIG. 6I, the fabric deployment management system 208 may extract a deployment image file 616 from each of the virtual leaf switch devices 624*a*-624*d* and the virtual spine switch devices 626*a* and 626*b* (as indicated by the bolded arrow). As discussed above, the deployment image file 616 for each of the virtual leaf switch devices 624a-624d and the virtual spine switch devices 626a and 626b may include a deployment image that includes a dump of each virtual disk partition that is provided in a partition data object (e.g., a partition BLOB) and a configuration file (e.g., a GRUB configuration file).

The method 500 then proceeds to block 516 where each deployment image file is stored in the fabric deployment image database in association with the physical networking device identifier assigned to the cloud-based networking device associated with that deployment image file. In an embodiment, at block 516, the fabric deployment management system 208 may store each deployment image file in the fabric deployment image database 212. For example, the fabric deployment management system 208 may push the deployment image file that includes the deployment image (e.g., the partition BLOBs) and the configuration file (e.g., <switch-service-tag>_grub.config) to the fabric deployment image database 212. In various embodiments, the fabric deployment management system 208 may notify the DHCP server 210 that the deployment image files, which are each associated with a respective physical networking device identifier, are stored in the fabric deployment image database 212. For example, the fabric deployment management system 208 may publish a link of the location in the fabric deployment image database 212 of each deployment image file to the DHCP server 210. In various embodiments, the fabric deployment management system 208 may also provide the DHCP server 210 the customized cloud partition file (e.g., <switch-service-tag>_<platform>_cloud_partitions.json.) for each cloud-based networking device by storing the customized cloud partition files in the fabric deployment image database 212 with the data image file, and/or providing the customized cloud partition files to the DHCP server 210.

Figure 6J:
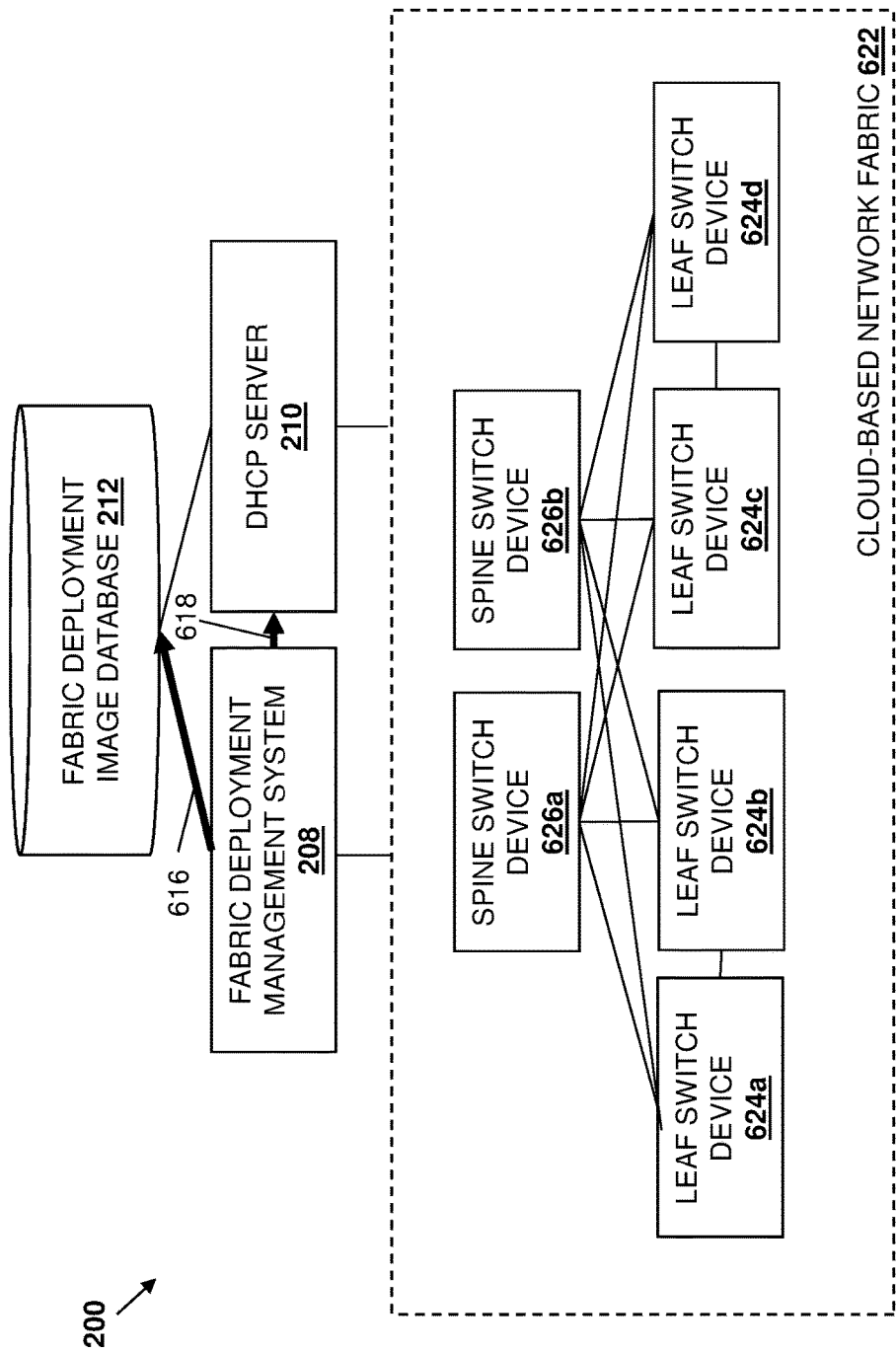
Figure 6K:
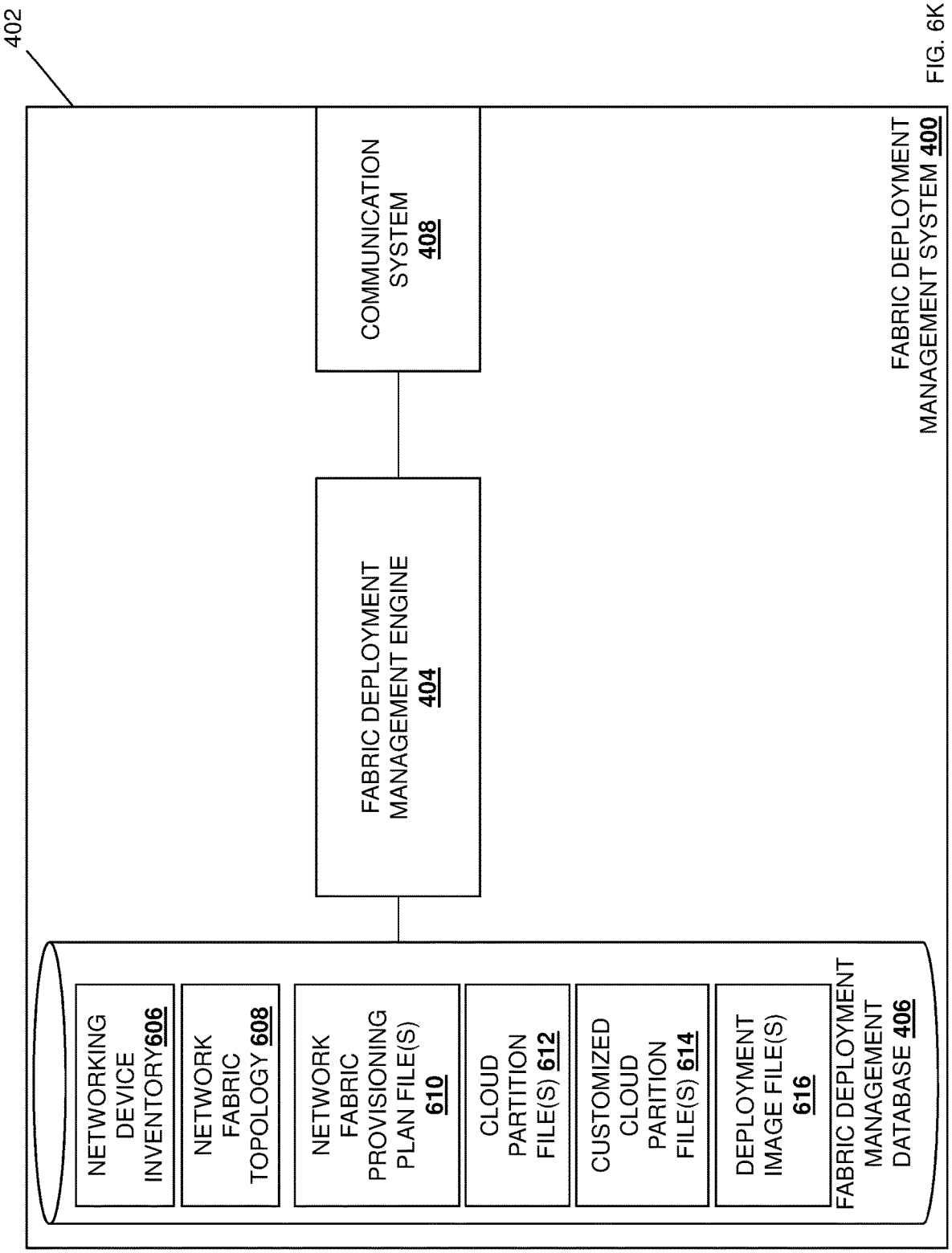

With reference to FIGS. 6J and 6K, the fabric deployment management system 208 may store the deployment image file 616 from each of the virtual leaf switch devices 624a-624d and the virtual spine switch devices 626a and 626b in the fabric deployment image database 212 (as indicated by the bolded arrow). Furthermore, the fabric deployment management system 208 may also store the customized cloud partition files 614 in the fabric deployment image database 212 and/or provide the customized cloud partition files 614 to the DHCP server 210 (as indicated by the bolded arrows). The fabric deployment management system 208 may also provide a notification 618 to the DHCP server 210 (as indicated by the bolded arrow) that indicates to the DHCP server 210 where in the fabric deployment image database 212 that the deployment image files 616 and/or the customized cloud partition files 614 are stored. The notification may include the physical networking device identifier (e.g., a service tag) associated with each deployment image files 616, and/or each customized cloud partition files 614. In various embodiments, the cloud-based network fabric 622 may be decommissioned or otherwise brought down after the deployment image files 616 are retrieved from the cloud-based networking devices included the cloud-based network fabric 622.

Figure 6L:
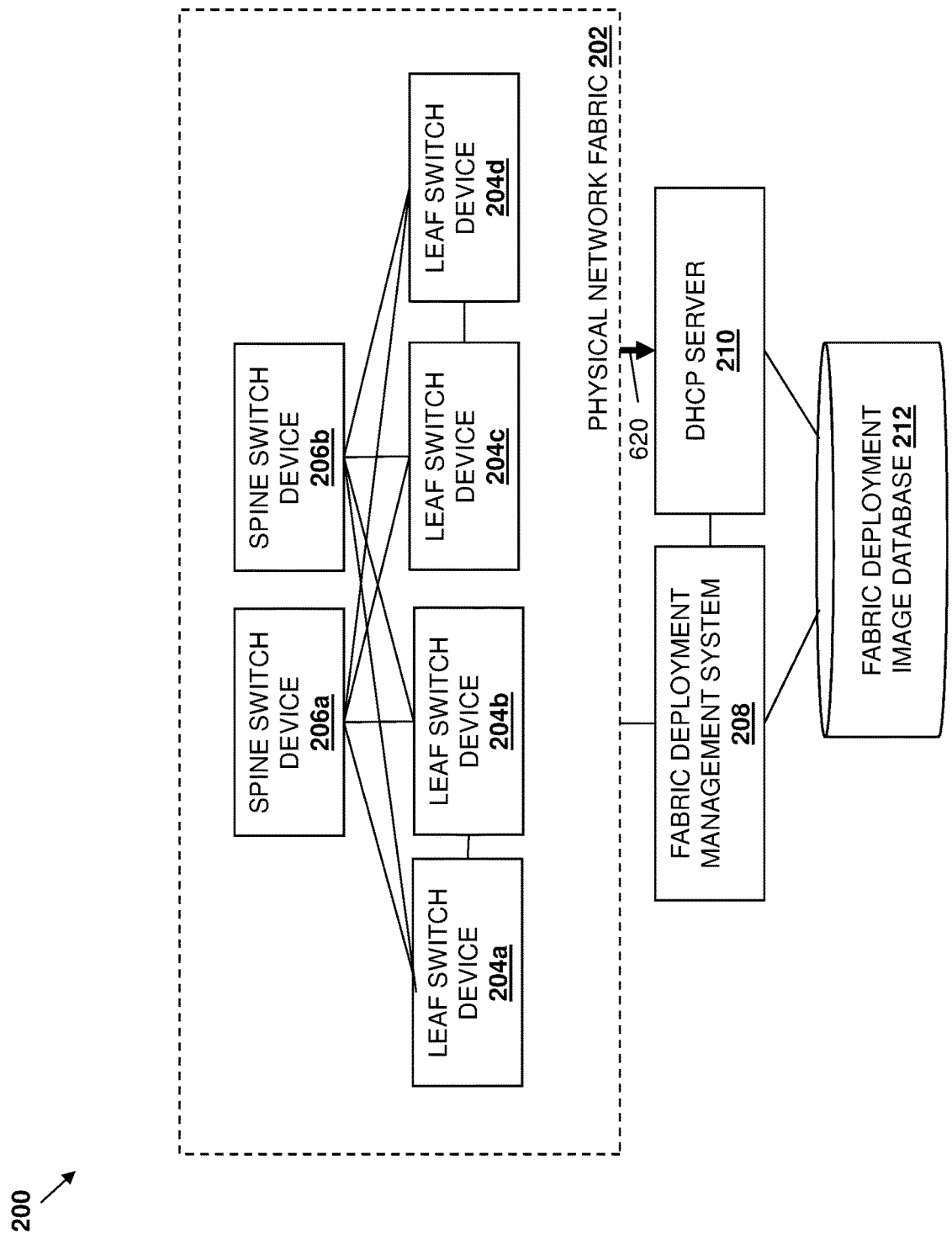

The method 500 may then proceed to block 518 where the DHCP server receives a DHCP request that includes a physical networking device identifier. In an embodiment, at block 518, the DHCP server may receive a DHCP request that includes a physical networking device identifier from a physical networking device. In various embodiment, the administrator may rack up, connect, and wire the physical networking devices (e.g., the leaf switch devices 204a-204d and the spine switch devices 206a and 206b) to form the physical network fabric 202. In other embodiments, the physical network fabric 202 may already be configured, but the administrator may have replaced a physical networking device, reconfigured the links between the physical network fabric, and/or may have performed some other action on the physical network fabric 202 that would cause one or more of the physical networking devices in the physical network fabric to be redeployed/reprovisioned. In an embodiment, when a physical networking device is powered on, the BIOS and/or the ONIE may load. For example, the BIOS (via the iPXE) and/or ONIE may start a fabric orchestration process (e.g., an SFD application, the ZTP, the ZTD solution, the BMP solution, and/or any other fabric orchestration process) with a DHCP request that includes one or more physical networking devices identifiers (e.g., the serial number, the MAC address, and/or the service tag) stored in the EEPROM component 304a of that physical networking device. With reference to FIG. 6L, the DHCP server 210 may receive a respective DHCP request 620 that includes a respective physical networking device identifier from the one or more of the leaf switch devices 204a-204d or the spine switch device 206a and 206b (as illustrated by the bolded arrow).

Figure 6M:
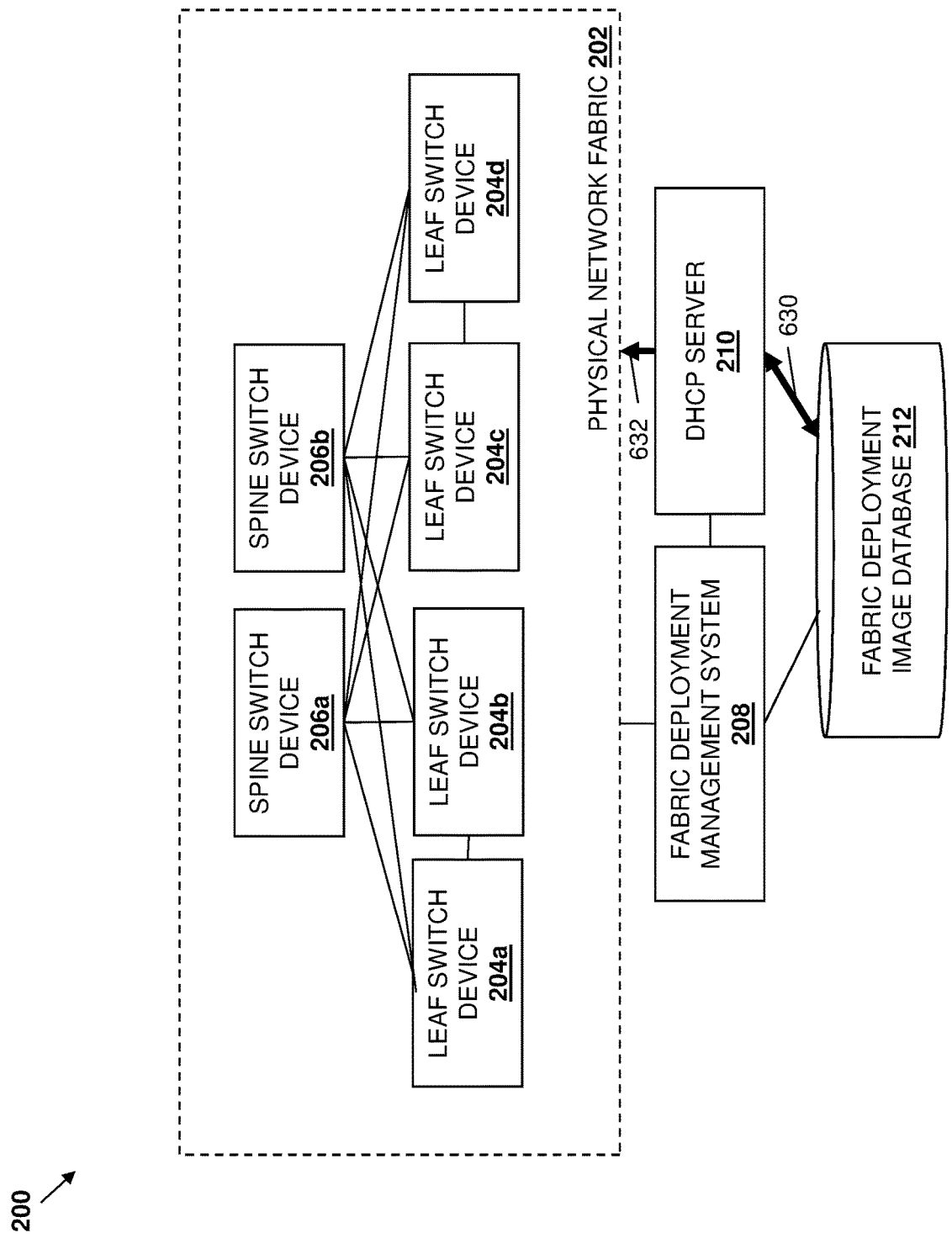

The method 500 then proceeds to block 520 where the DHCP server provides the first IP address and the first deployment image file to the first physical networking device based on the received DHCP request. In an embodiment, at block 520, the DHCP server 210 may determine that the physical networking device identifier in the DHCP request is associated with a physical networking device identifier that is associated with an IP address and a deployment image file stored in the fabric deployment image database 212. As discussed above, the cloud-based networking devices that correspond with a respective physical networking device in the physical network fabric 202 may have each already obtained an IP address using the physical networking device identifier of the physical networking device that was associated with that cloud-based networking device. As such, the DHCP server 210 may already have an association between the physical networking device identifier of the physical networking device that sent the DHPC request in block 518, and an IP address. Therefore, the DHCP server 210 may renew the lease of an IP address for the physical networking device based on the IP address that was already assigned to the cloud-based networking device that had the corresponding physical networking identifier. The DHCP server 210 may also retrieve the deployment image file associated with the physical networking device identifier from the fabric deployment image database 212. In some embodiments, the DHCP server 210 may also obtain the customized partition file associated with the physical networking device identifier received in the DHCP request. The DHCP server 210 may provide the IP address, the deployment image file, and the customized cloud partition file to the physical networking device that made the DHCP request in a DHCP response (e.g., a DHCP acknowledgement). With reference to FIG. 6M, the DHCP server 210 may retrieve the deployment image file 616 and the customized cloud partition file 614 from the fabric deployment image database 212 based on the physical networking device identifier received in the DHCP request 620 (as indicated by bolded arrow 630) and provide the deployment image file 616 and the customized cloud partition file 614 in a DHCP response 632 to the physical networking device that made the DHCP request 620 (as indicated by the bolded arrows).

The method 500 then proceeds to block 522 where the deployment image file is reconstructed on the physical networking device. In an embodiment, at block 522, the physical networking device on the physical networking fabric 202 that sent the DHCP request may receive the DHCP response that includes the deployment image file and the customized cloud partition file. For example, the BIOS (via the iPXE) or ONIE may, upon receiving the deployment image file, detect that the physical networking device has been deployed in the cloud-based network fabric. Using a DHCPv4 option 67 or a DHCPv6 option 59 (bootfile URL), the BIOS or ONIE may receive a boot file which will describe whether the switch has been validated in the cloud and may proceed to retrieving either an installer binary or partition data. The BIOS (via the iPXE) or ONIE may then flash the partition data objects (e.g., the <switch-service-tag>_<UUIDx>.blobs) included in the deployment image to the storage device (e.g., the operating system storage system 318) on the physical networking device (e.g., switch device 300). Furthermore, the BIOS (via the iPXE) or ONIE may update a current configuration file with the configuration file included in the deployment image file. For example, the ONIE may update an ONIE grub file in the storage component 304c using the configuration file (e.g., <switch-service-tag>_grub.config) included in the deployment image file, and the updating of the ONIE grub file may cause the switch device 300 to chain-load the NOS.

In various embodiments, when the NOS boots, partitions on the operating system storage device 318 may be resized using the customized cloud partition file. For example, when the NOS boots up, initramfs plugins may recognize that the partition data objects are coming up on a physical networking device, and may operate to resize the partitions on the operating system storage system 318 based on the customized cloud partition file (e.g., <switch-service-tag>_<platform>_cloud_partitions.json). The NOS's init service may then update the Master Boot Record (MBR) or the GUID Partition Table (GPT) to directly boot into NOS to avoid the NOS chain-loading during subsequent boots. After all of the physical networking devices (e.g., the leaf switch devices 204a-204d and the spine switch devices 206a and 206b) in the physical network fabric 202 boot, the fabric deployment management system 208 may perform any verification checks (e.g., sanity checks) to verify that the physical network fabric 202 is operational.

Figure 6N:
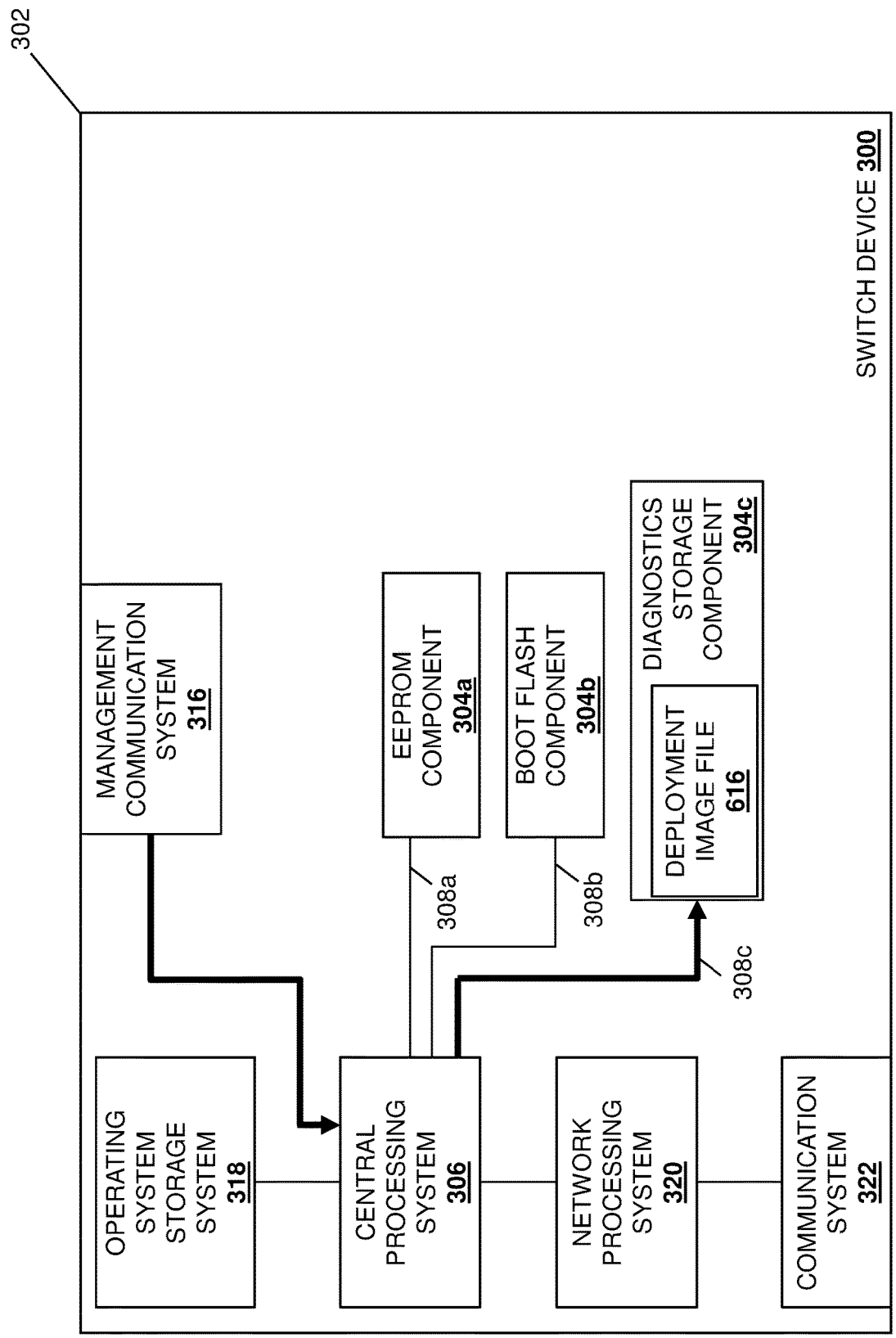
Figure 6O:
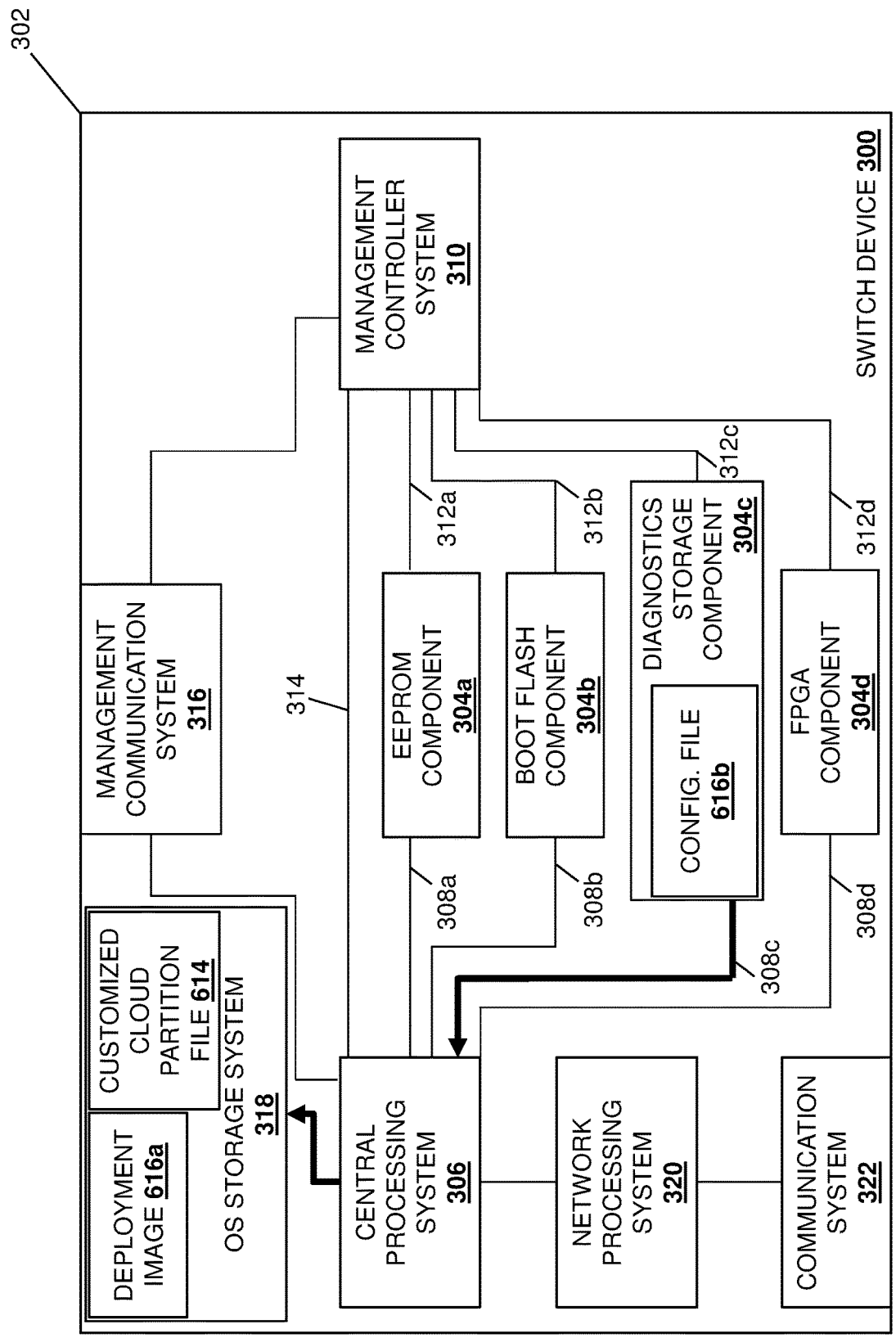

With reference to FIG. 6N, the ONIE provided by the storage component 304c may obtain the deployment image file 616 (as indicated by the bolded arrows via the management communication system). However, in other embodiments, the BIOS provided by the boot flash component 304b (via iPXE) may have retrieved deployment image file 616. With reference to FIG. 6O, ONIE provided by the storage component 304c may flash the partition data objects (e.g., the <switch-service-tag>_<UUIDx>.blobs) included in the deployment image 616a to the operating system storage system 318 on the switch device 300 (as indicated by the bolded arrows). Furthermore, the ONIE may update a current configuration file with the configuration file 616b included in the deployment image file. For example, the ONIE may update its ONIE grub file in the diagnostics storage component 304c using the configuration file 616b (e.g., <switch-service-tag>_grub.config) included in the deployment image file 616. When the NOS boots, partitions on the operating system storage device 318 may be resized using the customized cloud partition file 614.

Thus, systems and methods have been described that provide for network fabric deployment. A fabric deployment management system may use a networking device inventory of a physical network fabric that is connected based on a physical fabric topology (or that will be connected based on an intended physical fabric topology) to duplicate the physical network fabric as a cloud-based network fabric in a cloud-based staging area using virtual networking devices that include a virtual NOS, a virtual ONIE, and a customized partition table, which allows for the orchestration and validation of the deployment of virtual representations of the physical networking devices to generate the cloud-based network fabric. Once the cloud-based network fabric is deployed, the fabric deployment management system may extract partition images and configuration files from each cloud-based switch device to create a deployment image file that will be used by the BIOS via an iPXE application and/or the ONIE of each physical switch device in the physical network fabric to reconstruct and flash the pre-validated storage partition data, load a specific curated NOS image for that physical switch device which identifies that it booted from a pre-validated partition, expand the storage partition, and update the MBR or GPT to boot into the NOS directly on subsequent reboots. As such, the network fabric deployment system of the present disclosure reduces physical fabric deployment/rollback time by making deployment of physical switch devices more predictable, and isolates hardware issues during switch device replacement or during installation of a new network fabric, via the use of networking device images and configurations that have already been provisioned in a cloud-based network fabric.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network fabric deployment system, comprising:
a Dynamic Host Configuration Protocol (DHCP) server; and
a fabric deployment management system that is coupled to the DHCP server and that is configured to:
generate a virtual network fabric that is based on a network fabric topology and that includes a plurality of virtual networking devices,
wherein each of the plurality of virtual networking devices deployed in the virtual network fabric corresponds to a physical networking device included in a physical network fabric that is connected or will be connected according to the network fabric topology, and
wherein each virtual networking device is assigned a physical networking device identifier that identifies the physical networking device that corresponds to that virtual networking device;
configure and validate each of the plurality of virtual networking devices included in the virtual network fabric until the virtual network fabric is provisioned in a manner that allows the plurality of virtual networking devices to perform networking actions on data traffic, wherein the configuring and validating includes causing each of the plurality of virtual networking devices to obtain an Internet Protocol (IP) address from the DHCP server using the physical networking device identifier assigned to that virtual networking device such that that physical networking device identifier is mapped to the IP address at the DHCP server;

retrieve a deployment image file from each of the plurality of virtual networking devices that have been configured and validated, wherein each deployment image file includes a deployment image of that virtual networking device that has been configured and validated; and store each of the deployment image files in a fabric deployment image database in association with the physical networking device identifier assigned to the virtual networking device associated with that deployment image file.

2. The system of claim 1, wherein the DHCP server is configured to:

receive, from a first physical networking device, a DHCP request that includes a first physical networking device identifier;

determine that the first physical networking device identifier is associated with a physical networking device identifier that is associated with a first IP address and a first deployment image file stored in the fabric deployment image database; and provide the first IP address and the first deployment image file to the first physical networking device.

3. The system of claim 2, wherein the first physical networking device is configured to:

receive the first deployment image file and the first IP address;

determine that a corresponding virtual networking device has been pre-deployed based on the first deployment image file; and flash a first deployment image included in the first deployment image file on a storage of the first physical networking device.

4. The system of claim 3, wherein the first physical networking device is configured to:

resize, when a Network Operating System (NOS) on the first physical networking device boots and using a first cloud partition file that is included with the first deployment image file, partitions based on a recognition that the NOS is booting on a physical networking device rather than a virtual networking device.

5. The system of claim 3, wherein the first physical networking device is configured to:

update a Master Boot Record (MBR) or a GUID Partition Table (GPT) to directly boot into a NOS on a subsequent boot.

6. The system of claim 1, wherein the fabric deployment management system is configured to:

verify the physical network fabric that follows the network fabric topology when each of the plurality of physical networking devices boots with a respective deployment image.

7. The system of claim 1, wherein each of the deployment images includes:

a dump of a plurality of storage partitions included on that virtual networking device, meta data associated with each of the plurality of storage partitions, and a configuration file.

8. An Information Handling System (IHS), comprising:
a processing system; and
a memory system that is coupled to the processing system and that includes instructions that, when executed by the processing system, cause the processing system to provide a fabric deployment management engine that is configured to:

generate a virtual network fabric that is based on a network fabric topology and that includes a plurality of virtual networking devices, wherein each of the plurality of virtual networking devices deployed in the virtual network fabric corresponds to a physical networking device included in a physical network fabric that is connected or will be connected according to the network fabric topology, and wherein each virtual networking device is assigned a physical networking device identifier that identifies the physical networking device that corresponds to that virtual networking device;

configure and validate each of the plurality of virtual networking devices included in the virtual network fabric until the virtual network fabric is provisioned in a manner that allows the plurality of virtual networking devices to perform networking actions on data traffic, wherein the configuring and validating includes causing each of the plurality of virtual networking devices to obtain an Internet Protocol (IP) address from a Dynamic Host Configuration Protocol (DHCP) server using the physical networking device identifier assigned to that virtual networking device such that physical networking device identifier is mapped to the IP address at the DHCP server;

retrieve a deployment image file from each of the plurality of virtual networking devices that were configured and validated, wherein each deployment image file includes a deployment image of that virtual networking device that has been configured and validated; and store each of the deployment image files in a fabric deployment image database in association with the physical networking device identifier assigned to the virtual networking device associated with that deployment image file.

9. The IHS of claim 8, wherein the fabric deployment management engine is configured to:

provide, to the DHCP server, a first deployment image file of the deployment image files in the fabric deployment image database in response to a DHCP request provided to the DHCP server that includes a first physical networking device identifier that is associated with the physical networking device identifier associated with the first deployment image file, wherein the DHCP server provides the IP address and the first deployment image file to a physical networking device that made the DHCP request.

10. The IHS of claim 9, wherein the deployment image file causes the physical networking device to:

determine that a corresponding virtual networking device has been pre-deployed based on the deployment image file; and flash a first deployment image included in the first deployment image file on a storage of the first physical networking device to provide a provisioned physical networking device.

11. The IHS of claim 8, wherein the fabric deployment management engine is configured to:

verify the physical network fabric that follows the network fabric topology when each of the plurality of physical networking devices boots with a respective deployment image.

12. The IHS of claim 8, wherein each of the deployment images includes:

a dump of a plurality of storage partitions included on that virtual networking device, meta data associated with each of the plurality of storage partitions, and a configuration file.

13. The IHS of claim 8, wherein the fabric deployment management engine is configured to:
derive a customized cloud partition file that is based on a cloud partition file for a type of physical networking device and that is based on a network fabric provisioning plan for the virtual networking device.

14. A method for deploying a network fabric, comprising:
generating, by a fabric deployment management system, a virtual network fabric that is based on a network fabric topology and that includes a plurality of virtual networking devices,
wherein each of the plurality of virtual networking devices deployed in the virtual network fabric corresponds to a physical networking device included in a physical network fabric that is connected or will be connected according to the network fabric topology, and
wherein each virtual networking device is assigned a physical networking device identifier that identifies the corresponding physical networking device for that virtual networking device;
managing, by the fabric deployment management system, configuration and validation of each of the plurality of virtual networking devices included in the virtual network fabric until the virtual network fabric is provisioned in a manner that allows the plurality of virtual networking devices to perform networking actions on data traffic, wherein the configuring and validating includes causing each of the plurality of virtual networking devices to obtain an Internet Protocol (IP) address from a Dynamic Host Configuration Protocol (DHCP) server using the physical networking device identifier assigned to that virtual networking device such that that physical networking device identifier is mapped to the IP address at the DHCP server;
retrieving, by the fabric deployment management system, a deployment image file from each of the plurality of virtual networking devices that were configured and validated, wherein each deployment image file includes a deployment image of that virtual networking device that has been configured and validated; and
storing, by the fabric deployment management system, each of the deployment image files in a fabric deployment image database in association with the physical networking device identifier assigned to the virtual networking device associated with that deployment image file.

15. The method of claim 14, further comprising:
receiving, by the DHCP server, a DHCP request that includes a first physical networking device identifier;
determining, by the DHCP server, that the first physical networking device identifier is associated with a physical networking device identifier that is associated with a first IP address and a first deployment image file stored in the fabric deployment image database; and
providing, by the DHCP server, the first IP address and the first deployment image file to a first physical networking device that made the DHCP request.

16. The method of claim 15, further comprising:
receiving, by the first physical networking device, the first deployment image file and the first IP address;
determining, by the first physical networking device, that a corresponding virtual networking device has been pre-deployed based on the first deployment image file; and
flashing, by the first physical networking device, a first deployment image included in the first deployment image file on a storage of the first physical networking device.

17. The method of claim 16, further comprising:
resizing, when a Network Operating System (NOS) on the first physical networking device boots and using a first customized cloud partition file that is included with the first deployment image file, partitions based on a recognition that the NOS is booting on a physical networking device rather than a virtual networking device.

18. The method of claim 16, further comprising:
updating, by the first physical networking device, a Master Boot Record (MBR) or a GUID Partition Table (GPT) to directly boot into a NOS on a subsequent boot.

19. The method of claim 14, further comprising:
verifying, by the first physical networking device, the physical network fabric that follows the network fabric topology when each of the plurality of physical networking devices boots with a respective deployment image.

20. The method of claim 14, wherein each of the deployment images includes:
a dump of a plurality of storage partitions included on that virtual networking device, meta data associated with each of the plurality of storage partitions, and a configuration file.

* * * * *